United States Patent [19]

Yu et al.

[11] Patent Number: 5,483,647

[45] Date of Patent: Jan. 9, 1996

[54] SYSTEM FOR SWITCHING BETWEEN TWO DIFFERENT OPERATING SYSTEMS BY INVOKING THE SERVER TO DETERMINE PHYSICAL CONDITIONS TO INITIATE A PHYSICAL CONNECTION TRANSPARENT TO THE USER

[75] Inventors: Kin C. Yu, Burlington; Charles T. Mighill, Arlington; Teresa L. C. Wu, Watertown, all of Mass.; Christopher R. M. Bailey, Hollis, N.H.; Steven D. Lizotte, Dracut, Mass.

[73] Assignee: Bull HN Information Systems Inc., Billerica, Mass.

[21] Appl. No.: 992,945

[22] Filed: Dec. 17, 1992

[51] Int. Cl.$^6$ ................................ G06F 3/00; G06F 3/02; G06F 13/00; G06F 13/14

[52] U.S. Cl. .................... 395/500; 395/700; 395/200.02; 364/232.4; 364/240.7; 364/940; 364/940.61; 364/DIG. 1

[58] Field of Search ................................... 395/200, 700, 395/500; 364/200

[56] References Cited

U.S. PATENT DOCUMENTS

| | | | |
|---|---|---|---|
| 4,951,245 | 8/1990 | Bailey et al. | 364/900 |
| 5,027,271 | 6/1991 | Curley et al. | 364/200 |
| 5,134,580 | 7/1992 | Bertram et al. | 395/650 |
| 5,230,065 | 7/1993 | Curley et al. | 395/200 |
| 5,278,973 | 1/1994 | O'Brien et al. | 395/500 |

OTHER PUBLICATIONS

"Implementation of Real-Time Operating System for Integrated Swtiching System", Ozeki et al, IEEE, 1988.

Primary Examiner—Thomas C. Lee
Assistant Examiner—Rehana Krick
Attorney, Agent, or Firm—Faith F. Driscoll; John S. Solakian

[57] ABSTRACT

A hybrid system environment includes a proprietary operating system and processing unit and a non-proprietary operating system (UNIX based) and processing unit. The systems tightly couple to a system bus in common with a main memory and a number of multiline communications controllers and communicate through a common area of main memory. The UNIX terminal connections to such controllers are virtual connections applied by a virtual terminal driver through the system proprietary communications software components. These components include a server, a network terminal driver (NTD) and a number of multiplexer driver modules. A multiplexer physical terminal driver is included in the UNIX-based operating system and a switching mechanism is incorporated into the virtual terminal driver for enabling switching to such physical terminal driver when a user switches via a switch command to the UNIX-based operating system. The server module upon being invoked upon such switching operates to establish a direct communications path between an application running under the UNIX-based operating system and the controller communications line paths through the multiplexer driver module and logically disconnects the virtual communications line path from the NTD module to the multiplexer driver module thereby improving system efficiency and terminal connectivity.

23 Claims, 17 Drawing Sheets

Fig. 2

TTY TABLE 1 — 206
- RAW INPUT QUEUE
- CANONICAL QUEUE
- OUTPUT QUEUE
- OUTPUT BUFFER
- INPUT BUFFER
- DEVICE SPECIFIC ROUTINE
- INPUT MODES
- OUTPUT MODES
- CONTROL MODES
- LINE DISCIPLINE MODES
- DELIMITER COUNT
- TERMINAL TYPE
- TERMINAL FLAGS
- CURRENT COLUMN
- CURRENT ROW
- VARIABLE ROW
- LAST PHYSICAL ROW
- HIGH QUEUE PACKAGE CONT
- USED BY TERMINAL HANDLERS
- SETABLE CONTROL CHARACTERS
- EMAPPING STATE
- EXTENDED STATE
- SAVED EMAPPING CHARACTER
- EMAPPING ERROR FLAG
- EXTENDED STATE
- EMAPPING TABLE
- SAVED TIMEOUT CHARACTER

TTY LINE ARRAY ENTRY

TTY TABLE 2 — 206
- MAJOR/MINOR CODE
- LINE STATE
- DELAY TIMEOUT VALUE
- LOW LEVEL I/O CONNECTION TYPE
- SAVED INPUT MODE IND FLAG
- SAVED CONTROL MODE IND FLAG
- INPUT MAILBOX ADDRESS
- OUTPUT MAILBOX ADDRESS
- HVS LINE INFO / INPUT DATA BUFFER
- MLX CHANNEL SPECIFIC DATA

TTY DATA ARRAY ENTRY

CIM MAILBOX — 197
- MAILBOX TYPE
- INDEX WITHIN TYPE
- COPROCESSOR NUMBER
- INTERRUPT LEVEL
- HVS TASK ID
- MAILBOX AVAILABLE
- MAILBOX STATUS
- ATTENTION DPS
- ATTENTION XCP
- USAGE COUNT
- EXTENSION SIZE
- INTERRUPT NEEDED (XCP)
- BUFFER ADDRESS (XCP FORMAT)
- BUFFER ADDRESS (HVS FORMAT)
- BUFFER SIZE
- MAILBOX COMMAND
- STATUS
- DATA SIZE
- COMMAND SPECIFIC WORD 1
- COMMAND SPECIFIC WORD 2

INITIAL LINE STATE DATA — 194
- MCL VERSION
- PARAMETER BLOCK LENGTH
- DEVICE LRN
- WGT CHANNEL NUMBER
- INTERRUPT A INFORMATION (HVS)
- INTERRUPT B INFORMATION (HVS)
- WX_239 LEFT BYTE
- LINE REGISTER 0 INFORMATION
- LINE REGISTER 5 INFORMATION
- LINE REGISTER 4 INFORMATION
- LINE REGISTER 6 INFORMATION
- FLOW CONTROL INFORMATION
- GLOBAL WCT TABLE ADDRESS
- LINE SPECIFIC TABLE ADDRESS
- CONNECT CCP NUMBER
- DATA CCP NUMBER
- CONNECT CCP START ADDRESS
- DATA CCP START ADDRESS
- TRAP CCP START ADDRESS
- MLX FIRMWARE REVISION
- MODEM TABLE (CONNECT CCP)

NTD IORB STRUCTURES — 196
- CTL3
- EXTENDED LRN
- REQUEST BLOCK
- LINK
- CTL1 | CTL2
- BUFFER ADDRESS
- RANGE
- 1 | DEV WORD 1
- RESIDUAL RANGE
- STATUS
- EXTENSION
- DEVICE WORD 2

MLX LINE SPECIFIC DATA
- LINE STATE
- INTERRUPT CONTROL WORD A/B
- RECEIVE DATA BUFFER ARRAYS
- NEXT CCB TO ISSUE
- CURRENT CDB COUNTER
- OUTSTANDING READ INDICATOR
- TRANSMIT BUFFER
- TRANSMIT CCB COUNTER
- HVS INTERRUPT CONTROL WORD A
- HVS INTERRUPT CONTROL WORD B
- CHANNEL NUMBER
- CCP ADDRESS OF LINE SPECIFIC TABLES
- LINE CONFIGURATION BYTE 0
- LINE CONFIGURATION BYTE 1
- LINE CONFIGURATION BYTE 3
- LINE CONFIGURATION BYTE 2
- LINE CONFIGURATION BYTE 4
- FLOW CONTROL
- CONNECT CCP ADDRESSES
- DATA CCP ADDRESSES
- TRAP CCP ADDRESSES
- MLX FIRMWARE REVISION
- INPUT MODE FLAGS
- CONTROL MODE FLAGS
- MODEM TABLE INFORMATION

5,483,647

SYSTEM FOR SWITCHING BETWEEN TWO DIFFERENT OPERATING SYSTEMS BY INVOKING THE SERVER TO DETERMINE PHYSICAL CONDITIONS TO INITIATE A PHYSICAL CONNECTION TRANSPARENT TO THE USER

RELATED PATENT APPLICATION

The patent application of Kin C. Yu entitled, "Mechanism for Rerouting and Dispatching Interrupts in a Hybrid System Environment," bearing Ser. No. 07/992,209 filed on Dec. 17, 1992, which is assigned to the same assignee as this patent application.

BACKGROUND OF THE INVENTION

1. Field of Use

The present invention relates to terminal communications and more particularly, to terminal communications within hybrid system.

2. Prior Art

It has been found desirable to be able to provide data processing systems which incorporate a plurality of central processing units which operated under the control of different operating systems (i.e., operating systems having incompatible characteristics). An example of such a system is one which includes a proprietary operating system and a UNIX based operating system. In such systems, it is desirable to have the central processing units operate in a peer relationship wherein each processing unit is capable of accessing all of the resources within the entire system. This provides the users with access to a variety of resources and an expanded repertoire of programs without extensive reprogramming efforts or elaborate emulation techniques. An example of such a system is disclosed in U.S. Pat. No. 5,027,271 entitled, "Apparatus and Method for Alterable Resource Partitioning Enforcement in a Data Processing System Having Central Processing Units Using Different Operating Systems," invented by John L. Curley, et al. which issued on Jun. 25, 1991.

In the above system, the character terminal device (TTY) connections are provided through a number of multiline communications controllers for user applications logged on to one of the operating systems (i.e., proprietary operating system) which have switched to the other operating system (i.e., UNIX* based operating system) are all "virtual".

* UNIX is a registered trademark of X/Open Company Limited. That is, the original proprietary operating system continues to perform communications services for such applications. This has resulted in increased overhead to the proprietary operating system making less time available for processing its own applications.

Accordingly, it is a primary object of the present invention to provide a system which overcomes the above problems.

It is a more specific object of the present invention to provide greater terminal connectivity in a way which is transparent to the user.

SUMMARY OF THE INVENTION

The above objects are achieved in the hybrid system of the present invention. The system includes a proprietary operating system and processing unit and a non-proprietary (UNIX) based operating system and processing unit which communicate through a common area of main memory. The system further includes a number of multiline communications controllers which provide a plurality of communications lines for terminal connections. The UNIX terminal connections are virtual connections made by a UNIX virtual terminal driver through the proprietary operating system's communications software components. In the preferred embodiment, such components include a server and a network terminal driver (NTD).

The present invention provides a switching mechanism which is included in the UNIX terminal driver and a multiplexer physical terminal driver is included which operates under the control of the UNIX-based system and acts as the interface to the multiline communications controllers.

When a user application switches from the proprietary operating system to the non-proprietary system, the server is invoked and determines if the terminal device can be physically driven by the multiplexer terminal driver of the non-proprietary based operating system. If the physical conditions are met, the server initiates the physical connection. The server initializes the direct communications path and passes all pertinent connection information from the NTD component to the physical driver to establish communication with the multiline communications controller. Once the physical driver module is activated, the server module logically disconnects the communications path between the NTD driver and the multiplexer driver. User application input/output operations thereafter proceed through the multiplexer physical driver module. When a UNIX connection is terminated, all modified terminal information is passed back to the proprietary operating system for enabling reconnection. The connection and reconnection is performed automatically and is seamless to the user. That is, no login or logout to the UNIX-based operating system is required by the user.

According to the present invention, the direct or physical connection is automatically used. However, means are provided which allow a user to override the connection to the physical driver module and to retain the virtual connection path. This is accomplished in the system of the preferred embodiment by including a special argument in a command used by a user to switch/transfer control to the UNIX-based operating system or by setting up a local environment variable.

The above arrangement permits greater flexibility and reduces overhead contributing to improved efficiency.

The novel features which are believed to be characteristic of the invention, both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIG. 2 shows various data and control structures utilized by the present invention.

DESCRIPTION OF THE PREFERRED EMBODIMENT

Figure 1:
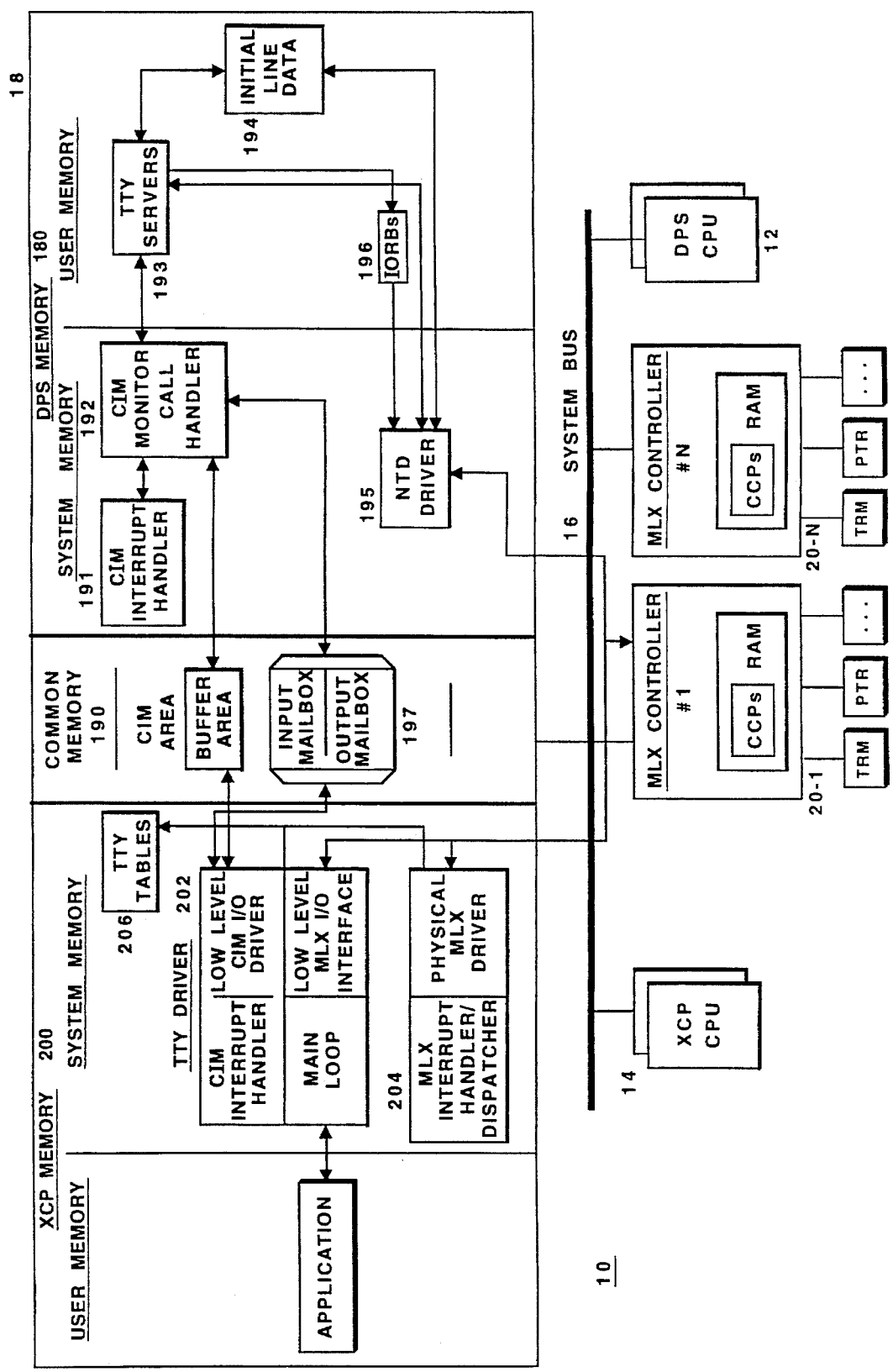
FIG. 1 is a block diagram of a system which incorporates a preferred embodiment of the present invention.

FIG. 1 shows in block diagram form, a multiprocessor system which incorporates the preferred embodiment of the present invention. As shown, the system 10 includes a central processing unit 12 and a peer processing unit 14 which tightly couple in common to a system bus 16, a main memory 18 and to a plurality of communications controllers 20-1 through 20-n. Each processing unit includes a bus interface area which enables the unit to transmit or receive requests in the form of commands, interrupts, data or responses/status to another unit connected to the system bus 16. In the preferred embodiment, the bus 16 operates asynchronously. For further information regarding this type of bus interface and operation, reference may be made to U.S. Pat. No. 3,997,896.

The processing unit 12 functions as a host processor and in the preferred embodiment, such processing unit may take the form of a Bull DPS6000 system which operates under control of the proprietary operating system known as the GCOS6 HVS operating system. For further information regarding the HVS operating system, reference may be made to the publication entitled, "HVS6 PLUS System Programmer's Guide," Volume 1, order no. HE05-02, published by Bull HN Information Systems Inc., copyright 1989. The peer processing unit 14 includes a high performance microprocessor such as the Intel 80486 chip and local memory which operates under the control of a UNIX based operating system. In the preferred embodiment, such processing unit may take the form of the XCP/486 processor manufactured by Bull HN Information Systems Inc.

Each of the controllers 20-1 through 20-n are multiline communications controllers, each of which connect In the system of FIG. 1, each processing unit is organized to operate in an independent manner and have access to the full complement of system resources, such as main memory, controllers 20-1 through 20-n and other input/output units. Each of the controllers 20-1 through 20-n connect to a number of asynchronous terminals, printers and the like. Such controllers operate under the control of channel control programs (CCPs) stored in a random access memory (RAM). These programs are code that directs the programmable controller firmware in the managing one or more of the 32 controller communication channels or 16 lines of each controller. In the preferred embodiment, such controllers may take the form of the MLX-16 controllers manufactured by Bull HN Information Systems Inc. This type of controller is generally described in U.S. Pat. No. 4,482,982.

FIG. 1 also illustrates in detail, the organization of main memory 18. As shown, main memory 18 is divided into a number of different regions or sections. These are a DPS memory region 180, a common memory region 190 and an XCP memory region 200. Each of the regions 180 and 200 are divided into a system memory region and an user memory region. The DPS system memory region is reserved for the GCOS 6 HVS operating system controlling processing unit 12 while the XCP system memory region is reserved for the UNIX based operating system controlling processing unit 14. The common memory region 190 is accessible to both processing units 12 and 14.

Considering the organization of memory 18 in greater detail, it is seen that the system memory regions of both operating systems include communications interface manager (CIM) modules which provide the means by which the DPS processing unit 12 and XCP processing unit 14 communicate with each other. Basically, the communication between such processing units is performed through common memory 190 using input and output mailboxes as indicated in FIG. 1. The memory 190 contains specific structures including page tables and other variable configuration information.

XCP Memory

As shown, the system memory of XCP processing unit 14 includes a terminal (TTY) driver module 202 and a physical terminal MLX driver module 204. The TTY driver module 202 includes a CIM interrupt handler section, a main loop section, a low level CIM input/output (I/O) driver section and a multiplexer (MLX) input/output (I/O) driver interface section. The TTY driver 202 operates as a switching mechanism to the specific physical driver. That is, it includes the low level input/output routines for providing the different application I/O commands to either the CIM driver section or multiplexer driver section as a function of line connection type (i.e., virtual line connection and physical connection). For the virtual line connection, the TTY driver module 202 via its low level driver section performs input/output operations (e.g. open, close, read, write) between XCP applications and communication devices which are attached to a MLX communications controller 20. As explained herein, the TTY driver module 202 carries out the execution of such input/output operations through the HVS operating system. As shown, the TTY driver module 202 is connected to communicate with the HVS operating system through a pair of mailboxes 197 and a buffer area which are included common memory 190. The different sections of the TTY driver module 202 have access to a plurality of TTY tables 206 which store the data structures used in processing input/output operations.

The MLX driver module 204 enables the establishment of direct communications between XCP applications and communication devices which are attached to a MLX communications controller 20 when operating under the control of the operating system of XCP processing unit 14. As shown, the MLX driver module 204 includes an MLX interrupt dispatcher section and an MLX driver section. The MLX driver section of the MLX driver module 204 has an interface to the MLX input/output driver interface section of TTY driver module 202 in addition to an interface with each MLX communications controller established through the network terminal driver (NTD) channel control program (CCP) as described herein.

DPS Memory

The system memory of the HVS operating system of DPS processing unit 12 includes a CIM interrupt handler module 191, a CIM monitor call handler module 192 which operatively couples to the CIM interrupt handler module 191 and a network terminal driver (NTD) module 195. As shown, the CIM monitor call handler module 192 is connected to receive information through the CIM buffer area and transmit and receive information via the mailboxes of common memory 190. The CIM interrupt handler module 191 is created at HVS-system boot time during configuration load manager (CLM) processing. When the HVS system startup procedure is executed, an initialization request is sent to the interrupt handler. The CIM interrupt handler starts its interval timer and fixes itself to the least used DPS CPU. The first requestor interrupt causes the interrupt handler to enter its main processing loop. When the XCP operating system is brought up, the structures used by the CIM are initialized, the mailbox array is created in the common memory area and the interrupt handler becomes operational. The CIM interface exists for the life of the HVS system. When the CIM interrupt handler is activated by an interrupt from the XCP processing unit, the interrupt counter is incremented and the mailbox array is scanned for pending messages.

The NTD driver module 195 supports a wide variety of terminal, printer and workstation endpoints. The specific device support is implemented by device profiles for each device type and the NTD driver module 195 operates in a number of different modes depending upon the type of device being supported and the way the applications wish to utilize the device. In the preferred embodiment, the NTD driver module 195 takes the form of the driver disclosed in U.S. Pat. No. 4,951,245 which was issued on Aug. 21, 1990. Reference may also be made to the publication entitled, "HVS6 PLUS System Programmer's Guide," Volume 1, published by Bull HN Information Systems Inc., Order No. HE05-02, dated January, 1989.

The user memory of the HVS operating system includes a TTY server module 193 which operatively couples to CIM monitor call handler 192. Additionally, the module 193 is connected to access data structures which are stored in initial line data and input/output request block (IORB) tables 194 and 196. These same tables are accessed by the NTD driver module 195. The NTD driver module 195 also includes code which is designed to communicate directly with MLX controller 20. The IORB is the interface which carries out the physical I/O directly between the application and its line protocol handler. The IORB permits direct control by the user over communication processing.

The NTD driver module 195 supports a specific class of communications device such as asynchronous terminal devices. These devices are termed teleprinter compatible and include VIP terminals and keyboard send/receive (KSR) devices. Such terminals normally operate in a character mode wherein the user transmits and receives one character at a time. The NTD driver module 195 consists of two parts, one resident in main memory an the other called the channel control program (CCP) resident in the MLX controller 20.

As described herein, the IORB structure contains all of the information that an application requesting an I/O service must specify to define the operation to be performed. The IORB contains all the information an application requesting I/O service must specify to define the operation to be performed. Specifically, the IORB structure includes a logical resource number (LRN) that identifies the I/O device being addressed, the location and size of the buffer to be used for physical I/O transfers, the type of operation specified by the function code and optional device specific word and information concerning the result of the I/O request returned by the line protocol handler to the application after I/O completion. The NTD IORB structure used in the preferred embodiment of the present invention is shown in FIG. 2 and will be discussed in greater detail in connection with that figure. A second data structure used by the NTD driver module is the resource control table (RCT) which is accessible through the IORB via the LRN. This structure serves as the interface between the driver and its device(s) and is not normally user accessible.

A RAM data transfer facility is added to the NTD connect and asynchronous data CCPs which performs a down line load of line specific profile information, NTD table information requested by the MLX driver 204 to the MLX controller 20 RAM without having to perform a controller RAM write I/O operation. This is a type of pseudo RAM transfer which transfers data, a byte at a time from the XCP memory into the controller RAM under the control of the NTD CCP. Such transfer is able to take place without requiring access to the full complement of control information such as that required for executing a RAM write I/O operation. This operation is used to update a line control table (LCT) residing in the controller RAM which maintains the status of every active line/station. It is updated by a channel control block (CCB) sent to the CCP by the MLX driver 204, as explained herein. The CCB contains the main memory address of a buffer communication data block (CDB) pointed to by the MLX CCB to which communications data is to be delivered or received therefrom.

DESCRIPTION OF DATA STRUCTURES

FIG. 2 shows the different data structures included in main memory 18 utilized in the preferred embodiment of the present invention. These include the TTY tables 206 which include the MLX Line Specific Data, the CIM mailboxes of block 190, the Initial Line State Data Structure of block 194 and the NTD IORB data structure of block 196. As seen from FIG. 2, the TTY tables 206 include first and second tables for storing TTY line array entries and data array entries, each of which include a number of 16 bit fields. These entries contain the MLX connection information received from the HVS operating system as discussed herein. In general, since much of the same type of information is commonly used by TTY line handlers, the different fields of such entries will not be discussed herein. For the purpose of the present invention, the format of the TTY line array entry is considered to be standard.

Similarly, the format of the TTY data array entry can be considered to be standard with the exception of the inclusion of several new fields. These fields include a low level I/O connection type field, a physical connection information labeled HVS line info, and a MLX parameter structure block field labeled MLX line specific data. The low level I/O connection type field is a one bit indicator whose state defines the type of controller connection. When the indicator is in a binary ZERO state, it defines a standard CIM connection which utilizes the low level CIM driver of block 202. When the indicator is in a binary ONE state, it defines a MLX controller connection which utilizes the MLX driver and MLX I/O driver interface. The HVS line information field contains physical connection information pertaining to when a physical connection is in use and when a physical I/O operation is in progress. The field includes a PCON-INFO indicator whose binary ONE state indicates that a physical connection is in use, a INPCLOSE indicator whose binary ONE state indicates that a physical I/O connection is being terminated, a PERMANENT indicator "whose binary ONE state indicates a permanently connected line, and a PBUSY indicator whose binary ONE state indicates that the physical output is busy.

The MLX line specific data field identifies a further data structure containing the MLX line specific data utilized by the MLX driver module according to the present invention. There can be up to n number of such structures enabling the MLX driver module to concurrently handle a large number of communications operations involving different ones of the controllers 20-1 through 20-n. As shown, the MLX line specific data structure includes a plurality of 16 bit fields. These include line state field, interrupt control word, a receive data buffer word, an index of the next CCB to issue, the current CDB counter value, a field to keep track of any outstanding read, a transmit buffer field, a transmit CCB counter, HVS interrupt control word A and B fields, a channel number field, and the CCP address field for designating line specific tables. The MLX data structure also includes four line configuration byte fields wherein byte0 defines the type of line (e.g. 8/7 bits, half/full duplex, parity detection, RS232/RS422 connections, etc.), byte1 contains the adapter ID, byte2 defines the data rate, byte3 defines the character configuration and byte4 defines the character size, a flow control word field for defining transmit/receive flow, connect CCP addresses field, data CCP addresses field, trap CCP addresses field, a MLX firmware revision field, an input mode flags field, a control mode flags field and modem table information field (256) used for CCP connects.

As shown, FIG. 2 includes an initial line state data structure used by the MLX driver module 204. This structure contains physical terminal driver termination information received from the Pterm structure. As seen in FIG. 2, the initial line state data table 194 contains a number of bit entries, formatted as shown. A number of the fields in each entry contain the same information as contained in the MLX line specific data structure of block 206. In greater detail, each entry has a first field containing the version number of the initial line data structure to facilitate making release changes, a second field designating the length of the parameter block, a field containing the logical channel number (LCN) of the device being interrogated, a field containing the channel number associated with the workstation group table (WGT), HVS interrupt A/B level information fields, a workstation extension line characteristic information (wx_ 239) left byte field and line register 0, 5, 4, and 6 information fields. The structure further includes a configuration flow control information field (enable/disable flow control), a field containing the CCP address of the global workstation control table (WCT) tables, a field containing the CCP address of the line specific tables, a field containing the connect CCP number, a data CCP number field, connect, data and trap CCP starting address fields, a MLX firmware revision field and a filed containing modem table information for a connect CCP.

The NTD IORB data structure of block 196 is shown in FIG. 2. Each IORB contains a number of 16 bit words. These words include a CTL3 field, an extended LRN field identifying the device to be used, a task request block pointer field, a link field pointer to an indirect request block, control line ½ fields containing various status and indicator information, a buffer address field specifying the word address of a message buffer which contains an output message or is to receive an input message, and a range field specifying the number of bytes to be transferred.

The NTD structure further includes a first device word field containing device specific information such bits indicating the options to be included with the order/operation In the present invention, this field contains as a first bit, a Pterm indicator. Also, the structure includes a residual range field indicating the number of bytes not transferred, a status field indicating the mapping of hardware status into software status format, an extension field indicating the number of words in the IORB extension and a second device word field containing additional device specific information.

The CIM mailbox structures contained in block 190 are formatted as shown in FIG. 2. As shown, the mailbox structure includes a mailbox type field, an index within type field, a coprocessor number field, an interrupt level field, a HVS task identification field. It further includes mailbox available and status fields, DPS/XCP attention fields, a usage count field, an extension size field, an interrupt needed field, buffer address fields in XCP/HVS formats, a buffer size field, a status field containing a Pterm indicator, a data size field and two command specific word fields.

DESCRIPTION OF OPERATION

Figure 3A:
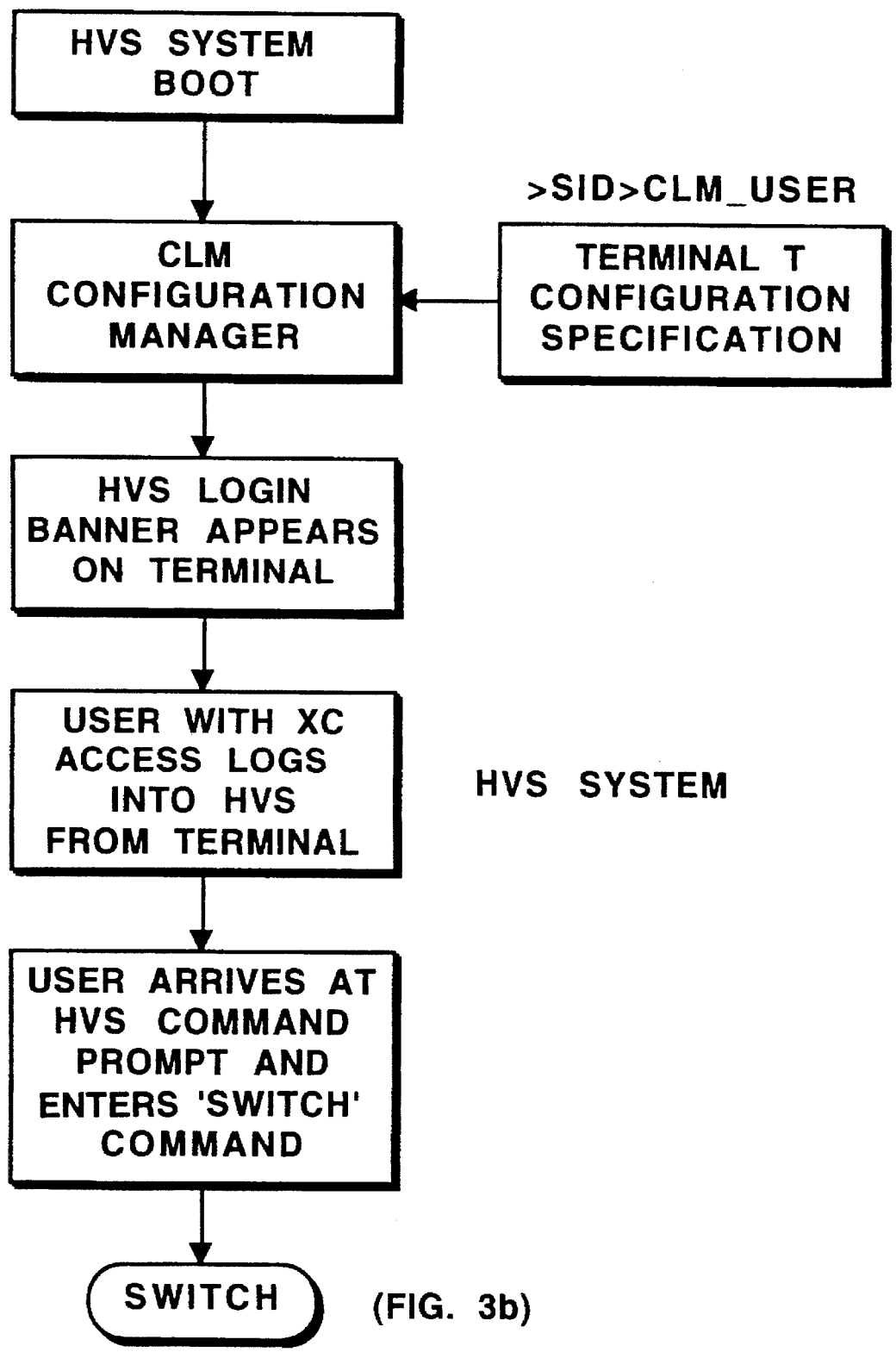
FIGS. 3a through 3o are flow charts used to describe the operation of the present invention.

With reference to FIGS. 1 and 2, the operation of the preferred embodiment of the present invention will now be described relative to the flow charts of FIGS. 3a through 3o. In the preferred embodiment of the present invention, a user is provided with several choices during a login procedure. The user can access either the DPS CPU 12 and the HVS operating system or the XCP CPU 14 and its operating system exclusively or the user can access both CPUs. This selection is provided via a login banner or a menu displayed on the user terminal. This operation is described in the patent application of John L. Curley, Thomas S. Hirsch, John C. Penney, Ileana S. Reisch, James M. Sandini, Theodore R. Staplin, and David A. Wurz entitled, "Apparatus and Method for Access to User Programs Controlled by a First Operating System by Users Interacting with a Data Processing System through a Second Operating System," bearing Ser. No. 07/136,058 filed on Dec. 21, 1987 which was subsequently abandoned. The access rights of the user are compared with the request resulting from the menu selection to ensure that the user access to the selected operating system is permitted.

After the user has been logged onto the DPS system, the user can then switch to the XCP processing unit and operating system, by issuing a switch command for bringing about the change in systems. The result is that while the users have 37 switched" to the XCP processing unit, the HVS operating system continues to perform communications functions for such users. For example, users that have logged in through NTD module MLX controller connections and have switched to the XCP processing unit, still have all I/O operations passed through the NTD module 195. There is no direct connection to a device on the XCP side. Such connections are all "virtual" and this type of virtual terminal processing is called "VTERM".

During such operation, every time a user issues an input/output operation to the XCP operating system, it causes the operating system to interact with the TTY driver module 202 as if it were going to execute the operation. However, instead of executing the operation, the TTY driver module 202 causes the generation of an interrupt to the HVS operating system. This results in the operation being processed by the TTY server through the NTD driver module 195. This additional traffic created by these operations places a burden on the HVS operating system. The present invention incorporates modules into the system for eliminating this burden.

Now the operation of the present invention will be described with reference to FIGS. 3a through 3o. It is assumed that the system 10 has been first initialized in a conventional manner. As shown in FIG. 3a, the HVS operating system is booted which is followed by the CLM configuration manager software accessing the configuration resource table containing device information which define the device resources to be allocated to the HVS operating system. More specifically, the CLM software accesses the file >SID>CLM_USER wherein SID is the directory and CLM_USER is the file name. This file contains the configuration device information for user terminal T.

The CLM software transfers control to a listener module which generates a login banner on the terminal display screen telling the user that the user can login. Next, the user with XCP access rights logs into the HVS operating system from the terminal T. This results in a login command sequence which transfers to the HVS command level resulting in the display of an HVS prompt. At that point of the HVS command prompt, the user enters a "switch command"

for connecting the user's terminal to the XCP operating system.

In accordance with the present invention, the switch command has the format: SWITCH-[XCP command line] [–NPHYS]. The [XCP command line] argument is used as follows. If the SWITCH command is issued with no XCP command line argument, the user is logged into the XCP operating system normally, arriving at the XCP command level. If the user specifies an argument with the SWITCH command, the user enters the XCP operating system in a transient mode. That is, the user remains in the XCP operating system only for the duration of the execution of the XCP command line, then the user automatically returns to the HVS command level. The [–NPHYS] argument is used as follows. If the SWITCH command is issued with argument [–NPHYS] indicating no physical connection, then the connection to the XCP operating system remains virtual.

Figure 3B:
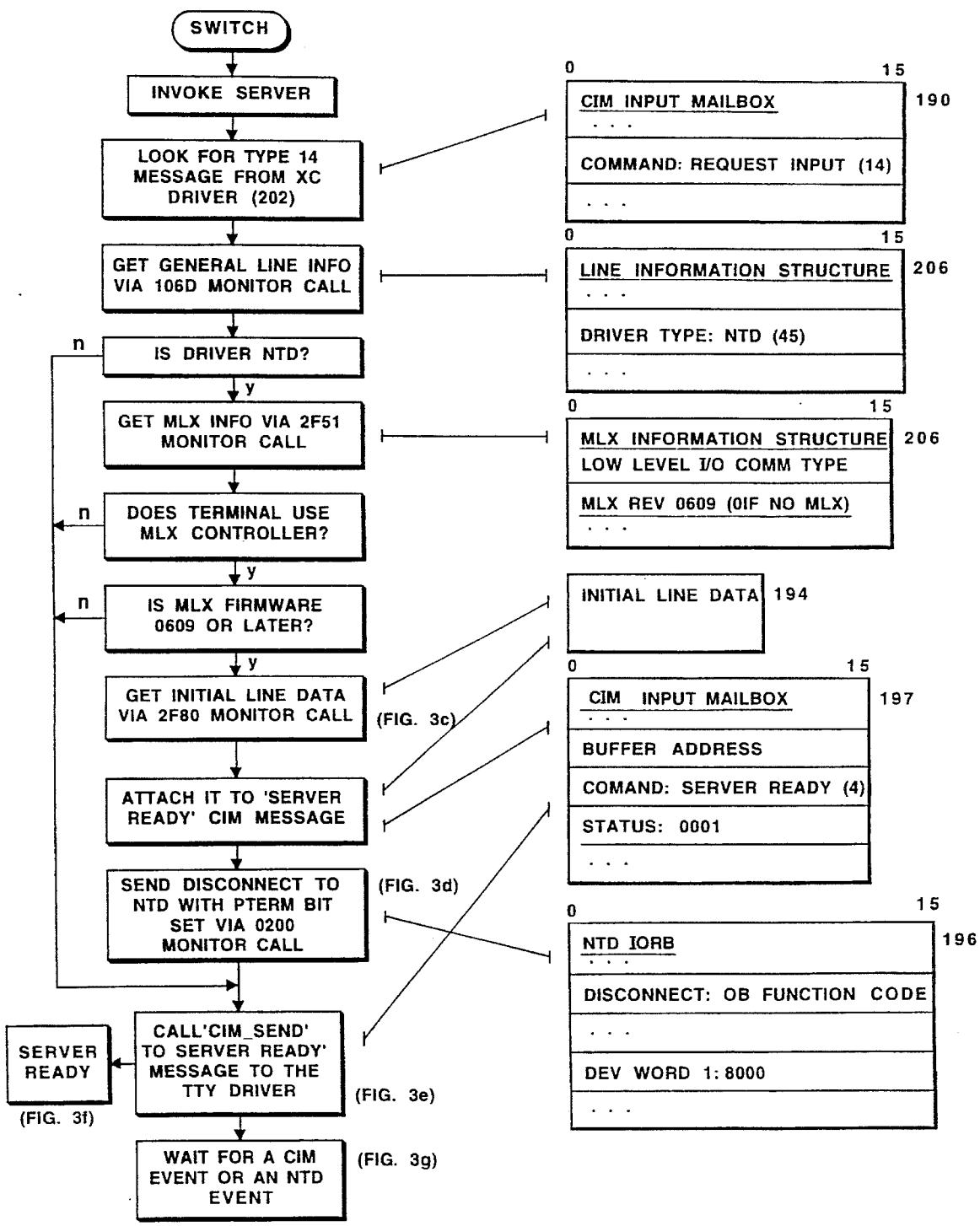

As seen from FIG. 3b, when the SWITCH command is issued, the TTY server 193 is invoked. It now becomes a matter of verifying that the TTY driver 202 is alive/active, that communications can be established between the server 193 and the XCP operating system (i.e., TTY driver 202). To do this, server module 193 generates a request for input and tries to receive something from the TTY driver module 202 through a CIM channel (mailbox).

Next, the server looks for a type 14 message (request for input) from the XCP driver module 202. As shown in FIG. 3f, the XCP processing unit and operating system will have been initialized and this results in the initialization of the line. That is, in the initialization a first created process unit executes an infinite loop, reading a file "/etc/inittab" for instruction about what to do when entering system states such as "single user" or "multi-user." In the multi-user state, a primary responsibility of the init process is to allow users to log onto terminals. It spawns processes called getty (for get terminal or get "tty") and keeps track of which getty process opens which terminal. As shown in FIG. 3f, the "getty" process is attached to the TTY terminal line which results in the opening of the line. When the line is opened, this causes the TTY driver module to start talking to the TTY server 193. In the present system, login proceeds automatically (i.e., the required information login ID, password is provided by the HVS operating system).

As shown in FIG. 3f, the "open" function performed by the TTY driver module 202 results in the sending of a request for input message via an input mailbox of the CIM area to the TTY server 193. Generally, the TTY server just listens or monitors the mailboxes. When invoked, the TTY server scans the available mailboxes, searching for an unused pair. It determines if there is a free pair by seeing if there is a request for input. The server then obtains from the CIM mailbox, a prestored message indicating a request for input. Upon the receipt of such message, the TTY server 193 acknowledges its presence to the TTY driver module 202.

As shown in FIG. 3b, the TTY server 193 in response to such request, causes the CIM monitor call handler module 192 to issue a system monitor call (106D) to the HVS operating system and provides a buffer area for storing general line information received from the NTD driver module. This enables the TTY server 193 to obtain from the NTD driver module 195, general line specific information specifying the type of device driver handling the line. The NTD driver module processes the call and returns the line information it obtained to the TTY server's buffer area.

As seen from FIG. 3b, the TTY server examines the information next to determine if the driver-specified to handle the operation is the NTD driver module. Assuming that it is, the TTY server issues another system monitor call (2F51) to the HVS operating system to obtain information pertaining to the specific controller to which the activated line is connected. Here the TTY server accesses information similar to that contained in Table 2 of block 206. Specifically, it examines the low level I/O connection type field and if it is a binary ONE, this indicates that the connection type is a MLX controller connection. It then examines the MLX firmware revision field to see if it specifies a value of 0609 or greater.

When the TTY server 193 determines that the above established conditions are met, it concludes that the device can be physically driven by the XCP operating system (i.e., a PTERM connection can be used). If the physical connection conditions are not met, then the device will operate in VTERM mode.

As shown, the TTY server initiates the connection in a manner which is seamless, wherein no login/logout to the XCP operating system is required by the user. When possible, the PTERM connection is automatically used and is invisible to the user. However, the user can use the –NPHYS argument in the switch command to override the physical connection.

As seen from FIG. 3b, the TTY server 193 next makes a return PTERM connect information monitor call (2F80) for the purpose of obtaining the current line state information required by the XCP driver for managing the line. This information is obtained by the NTD driver module 195 from areas of HVS memory allocated to the storage of different NTD profile information accessible by the NTD driver module. The line specific information is used to fill in the MLX line specific data structure of block 206. Thus, the TTY server 193 causes the NTD driver module 195 to share line specific information over which it previously had exclusive control.

Figure 3C:
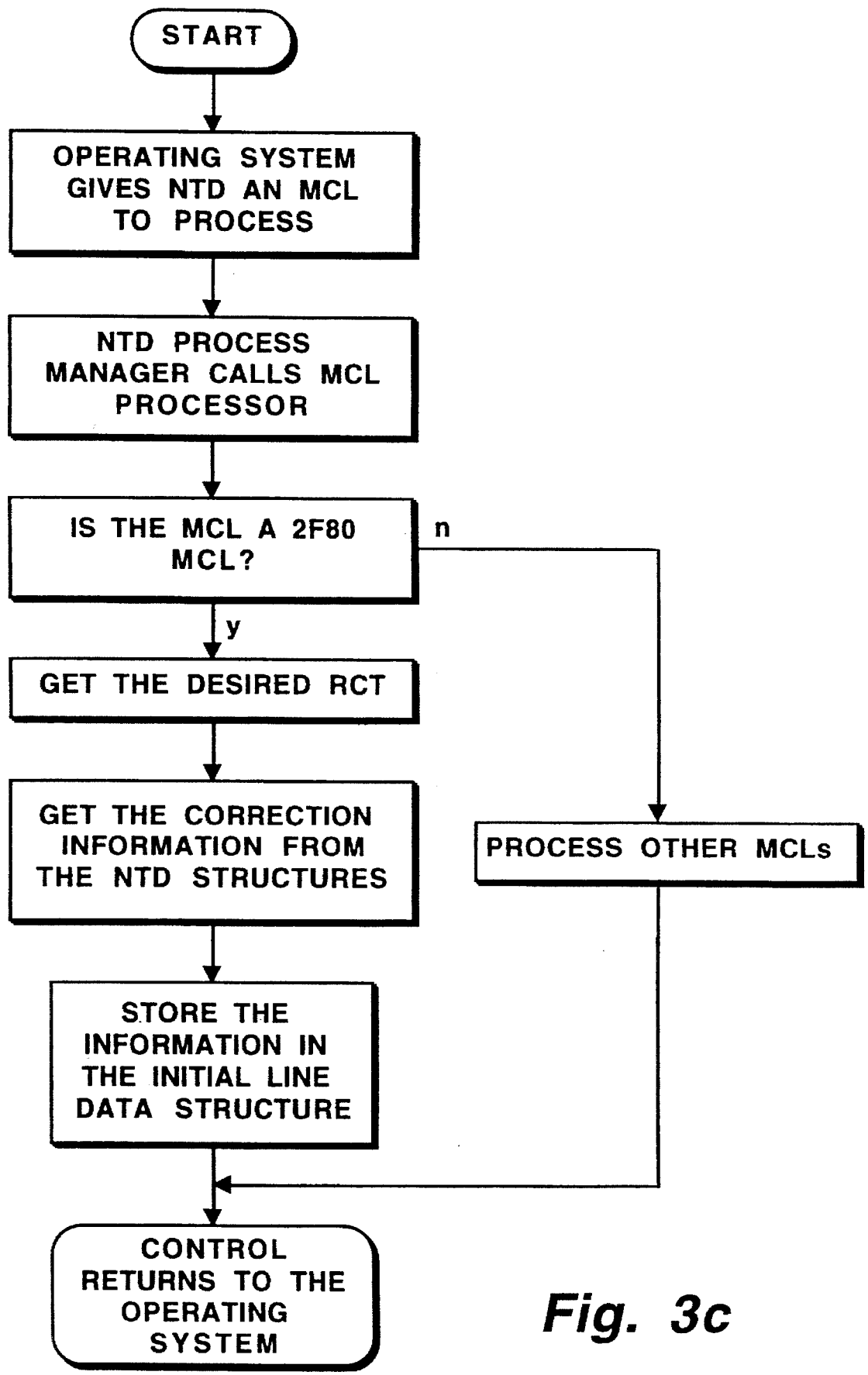

As shown in FIG. 3c, the HVS operating system gives the NTD driver module 195 the monitor call to process. The NTD process manager calls the MCL processor which examines the monitor call to determine if it is a PTERM monitor call (i.e., function code= 2F80). Since it is, the processor gets the desired resource control table (RCT) for the device and also gets the connection information from the NTD structures over which it has exclusive control. This information is stored into the initial line data structure block which corresponds to the Initial Line State Data block 194. Thereafter, control is returned to the HVS operating system.

The address of this data structure block 194 obtained by the NTD driver module 195 is included as part of a server ready message which the TTY server places into the CIM mailbox. The server ready message is the name of the message which is the server's response to the request for input. If a PTERM connection is established, there will initial line data attached to the message (attach refers to a pointer to the initial line data block buffer in the server). If there can be no PTERM connection, then there will be a zero address field in the mailbox. As indicated in FIG. 3b, the TTY server sets an indicator bit in the status byte of the input CIM mailbox structure indicating that the PTERM connection can be made. There is also a bit set indicating that the initial line data attached to the mailbox is valid and points to the initial line data structure.

As shown, the TTY server sends a disconnect to the NTD driver module 195 with the PTERM indicator bit set to a binary ONE state in the NTD IORB structure of block 196. This is done by placing a value of "8000" into the device specific word 1 field of block 196 along with the disconnect function code value "0B". The disconnect is sent via a system monitor call (0200).

Figure 3D:
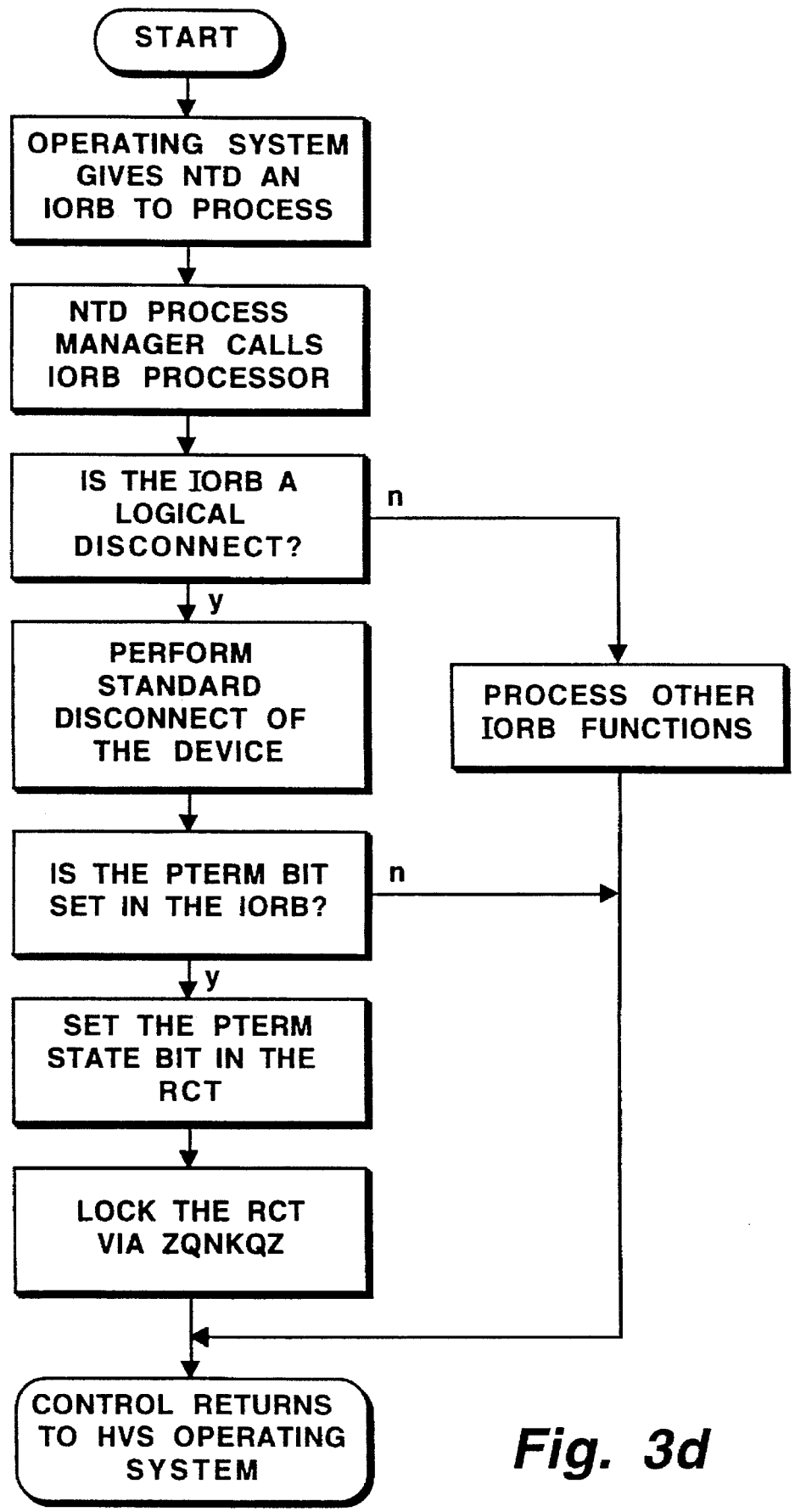

As shown in FIG. 3d, the HVS operating system gives the NTD driver module 195 the monitor call to process. The NTD process manager calls the IORB processor which first determines if the IORB specifies a logical disconnect. Since it does, the processor performs a normal logical disconnect of the device/line. It then determines if the PTERM bit is set in the IORB. Since it is, the processor sets a PTERM indicator bit in the r_stat field of the resource control table (RCT). Next, the NTD driver module calls a function (ZQNKQZ) which locks the RCT to ensure no race conditions.

With the RCT PTERM bit set, the state of the device is "logically disconnected" indicating that PTERM is in use. This bit is checked when the IORBs are validated and essentially results in the IORB being handled as if the device is logically disconnected. The IORBs are returned to the issuer with line disconnected error indication. Then control is returned to the HVS operating system.

Figure 3E:
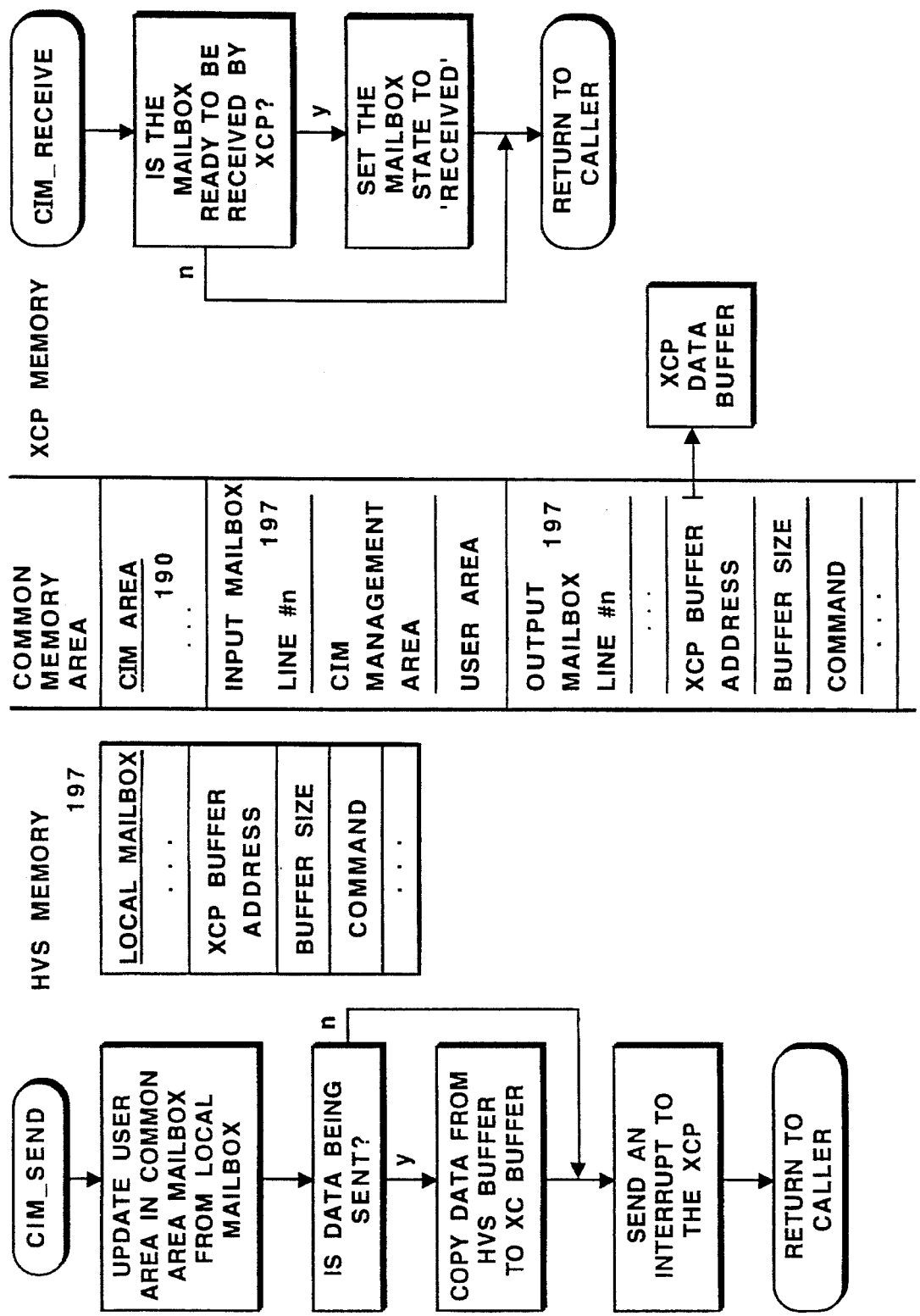
Figure 3F:
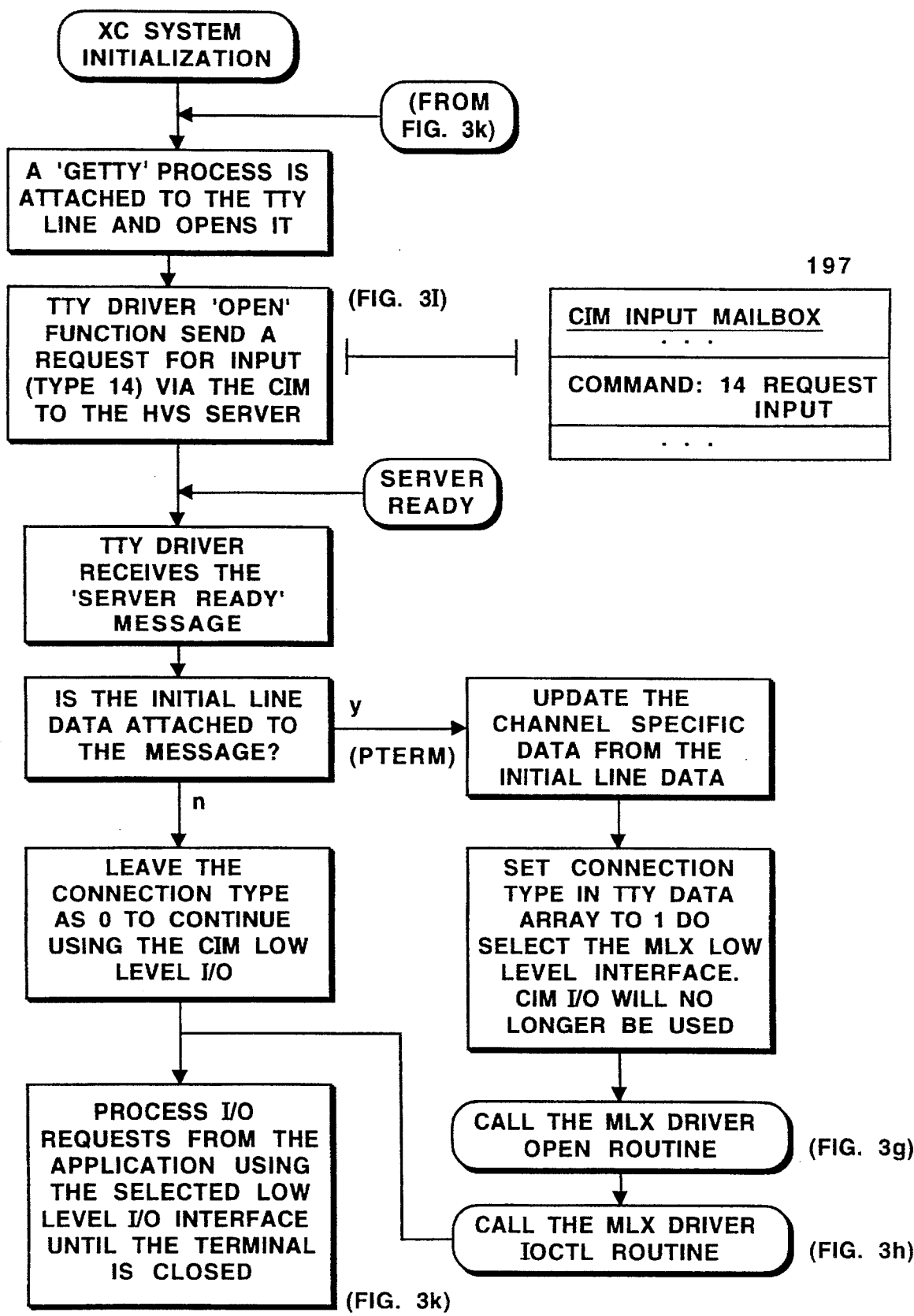

As shown in FIG. 3b, the TTY server calls the CIM interrupt handler CIM_Send section to forward to the TTY driver module 202 the server ready message which has attached the initial line data. The operations performed by the CIM interrupt handler message transfer are shown in FIG. 3e. As shown, the CIM_Send section updates the user area in the common area mailbox 190 from the local mailbox. Since data is being sent, the CIM_Send section copies data from the HVS buffer to the XCP buffer. It then sends an interrupt to the XCP operating system and returns control to the caller. The CIM_Receive section checks to see if the mailbox is ready to be received by the XCP operating system. When it is, it sets the mailbox state (i.e., mailbox command field) to the "received" state and returns control to the caller.

The TTY server suspends its operation and waits for a CIM event or an NTD event to occur (e.g. a DISABL CIM message from the TTY driver module 202). This completes the sequence for initiating a PTERM connection. Summarizing the above, the TTY server determines if a physical connection is possible. If it is possible, the TTY server obtains the required connection information by a return PTERM connect information monitor call to the NTD driver module and passes the information to the TTY driver module 202 via a server ready CIM message. The server places the line in the state required for the physical connection and logically disconnects the line from the NTD driver module by having the NTD driver module place the line into a special logical disconnect state to prevent applications which are being driven by PTERM from being successfully connected to another device driver.

As shown in FIG. 3f, the TTY driver module 202 receives the server ready CIM message from the server and first checks to see if there is initial line data attached. If there is not, the TTY driver module 202 leaves the connection type field as "0" to continue using the CIM low level I/O driver connection. It continues to process I/O requests from the XCP applications using the selected driver until the terminal is closed. That is, it continues, to operate in the VTERM mode.

Figure 3G:
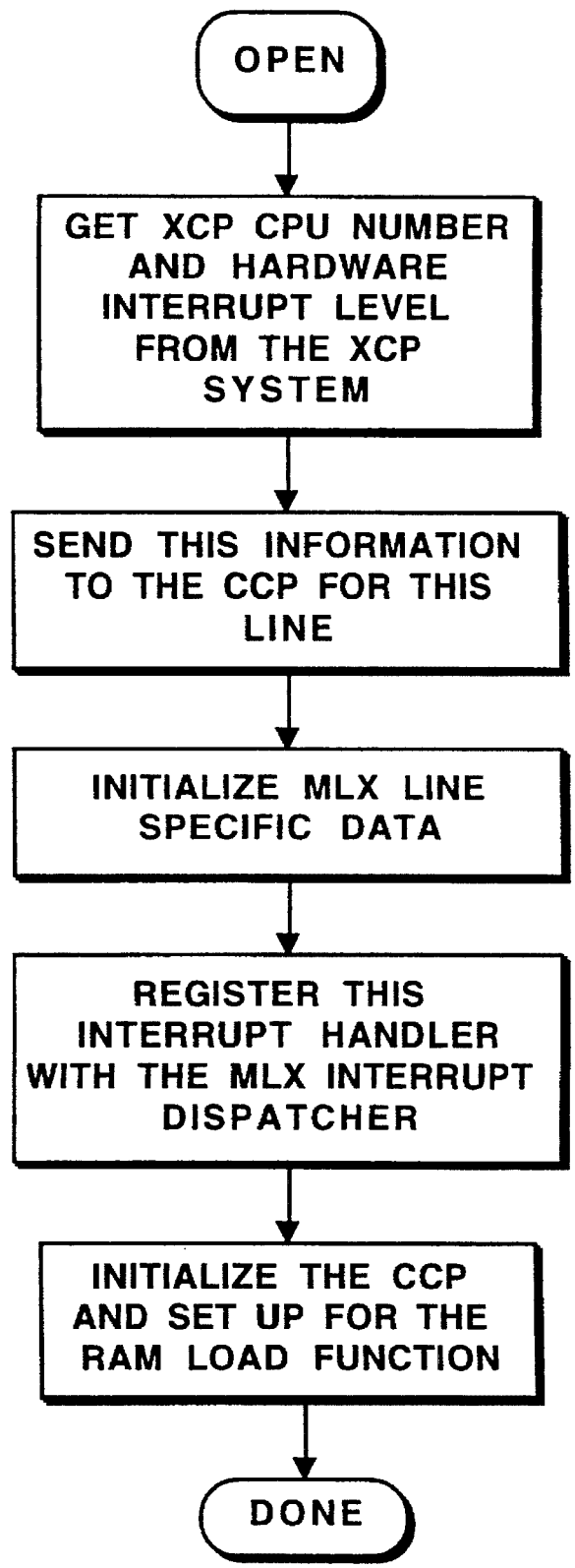

However, when there is initial line data attached to the server ready message, then the TTY driver module 202 updates the MLX line specific data with the information obtained from the initial line data structure. More specifically, the TTY driver module 202 sets the low level I/O connection type field of the TTY data entry to a binary ONE state for indicating the selection of the MLX I/O driver 204 instead of the low level CIM I/O driver. Next, the TTY driver module 202 issues an open call to the MLX driver module 204. This results in the execution of an MLX open routine which is shown in FIG. 3g. This routine called by the TTY driver module 202 is used to get ready to reconnect the switched line. The open routine calls the interrupt dispatcher to reroute the interrupts.

During this time, the MLX controller is in the process of setting up the interrupt and the CPU number which is currently set for the HVS CPU. In order for the CPU to interrupt the XCP operating system, it is necessary to obtain the XCP CPU number and interrupt level. The interrupt level is assigned by the XCP operating system (UNIX based) which determines what the interrupt level for all of the MLX controllers attached to the particular HVS system. That is, one level is shared by all of the controllers for every line. As shown, this information is obtained via the interrupt dispatcher and sent down to the MLX controller CCP for this line. An I/O command is issued to the MLX controller and the interrupt control word information for both channels (i.e., transmit and receive) is transferred to the MLX controller.

Next, the MLX driver module 204 initializes the MLX line specific data of block 206 (i.e., resets CCB list to clear any HVS read/write CCBs, initialize CCB counter, current CCB pointer, clear all transmit/receive CDB flags, clear some terminal flags). Then, the MLX driver open routine registers the transmit and receive interrupt handlers with the common MLX interrupt dispatcher. This is done by having the MLX interrupt dispatcher store the channel/line number entry for dispatching the interrupt to the proper driver interrupt routine for processing. For further information regarding the operation performed by the interrupt dispatcher, reference may be made to the copending patent application cited as a related patent application.

Lastly, the open routine initializes the MLX controller CCP and sets up for the RAM load function. It issues CCBs to as many CCBs as configured minus 1 (starts at zero) for setting the state to line reconnecting. It also issues a configuration A code which specifies setting the LCT write permit bit for A ram load operation using the special RAM to CCP instruction. As discussed earlier, this enables NTD profile information to be written byte by byte into the MLX controller RAM.

Figure 3H:
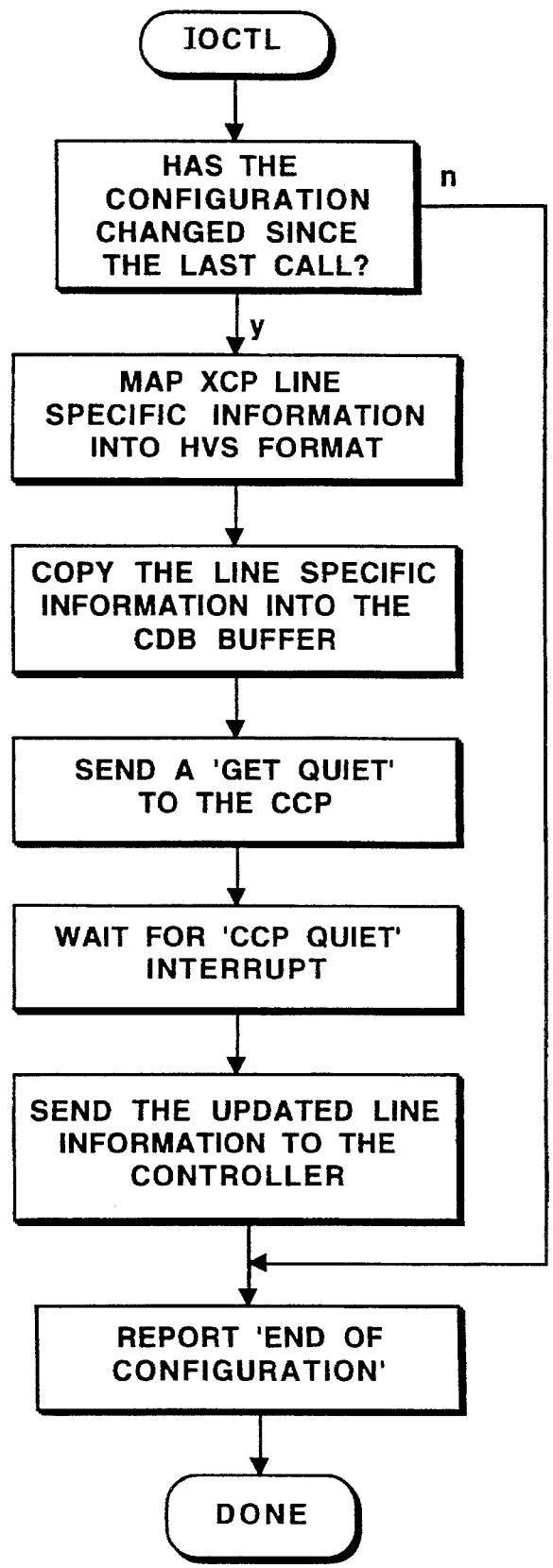

As shown, the open routine returns control back to the TTY driver 202. Next, it is assumed that the application via the TTY driver issues an ioctl command to change the characteristics of the line. As shown in FIG. 3f, the TTY driver calls the MLX ioctl routine of FIG. 3h. This routine first determines if the line configuration changed since the last call. If it has, the routine maps the XCP line specific information into HVS hardware characteristics (the UNIX based line characteristics are different from the HVS line characteristics). This is done for all such information and such information along with profile information, flow control information and modem table information are copied into a preallocated CDB buffer. Then, an I/O command is issued to the MLX controller to start the channel program and process this command for placing the CCP in a quiet or quiescent state.

When the MLX controller has been placed in a quiet state, it signals this event via an interrupt. The interrupt is received by the common MLX interrupt dispatcher which processes the interrupt, finds the matching channel and invokes the corresponding driver interrupt handler routine. At this point, the system is ready to receive information. The invoked interrupt handler first determines which level caused the interrupt, A or B, and what its status is: output complete, data arrival, error conditions or ioctl complete.

Figure 3I:
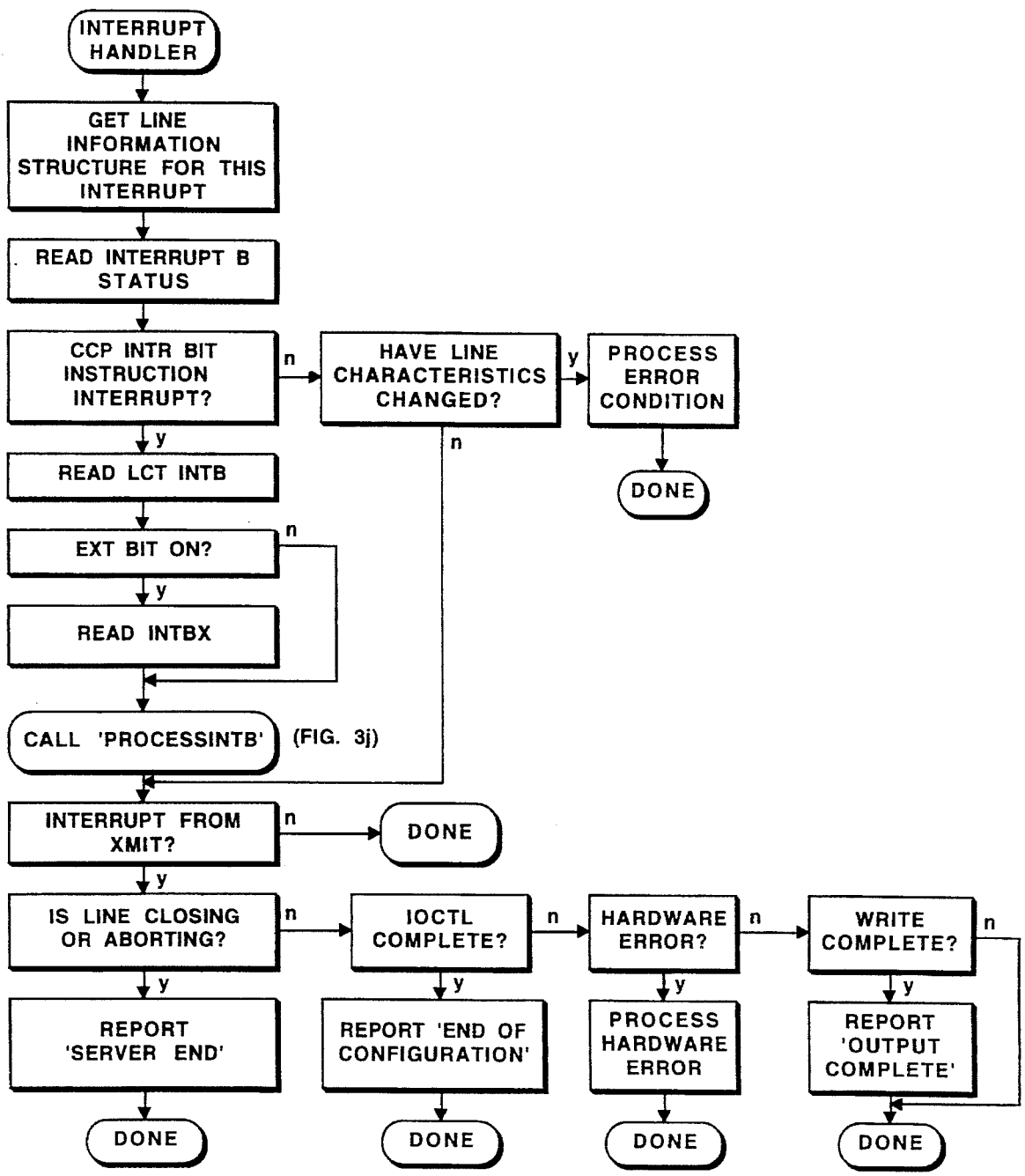
Figure 3J:
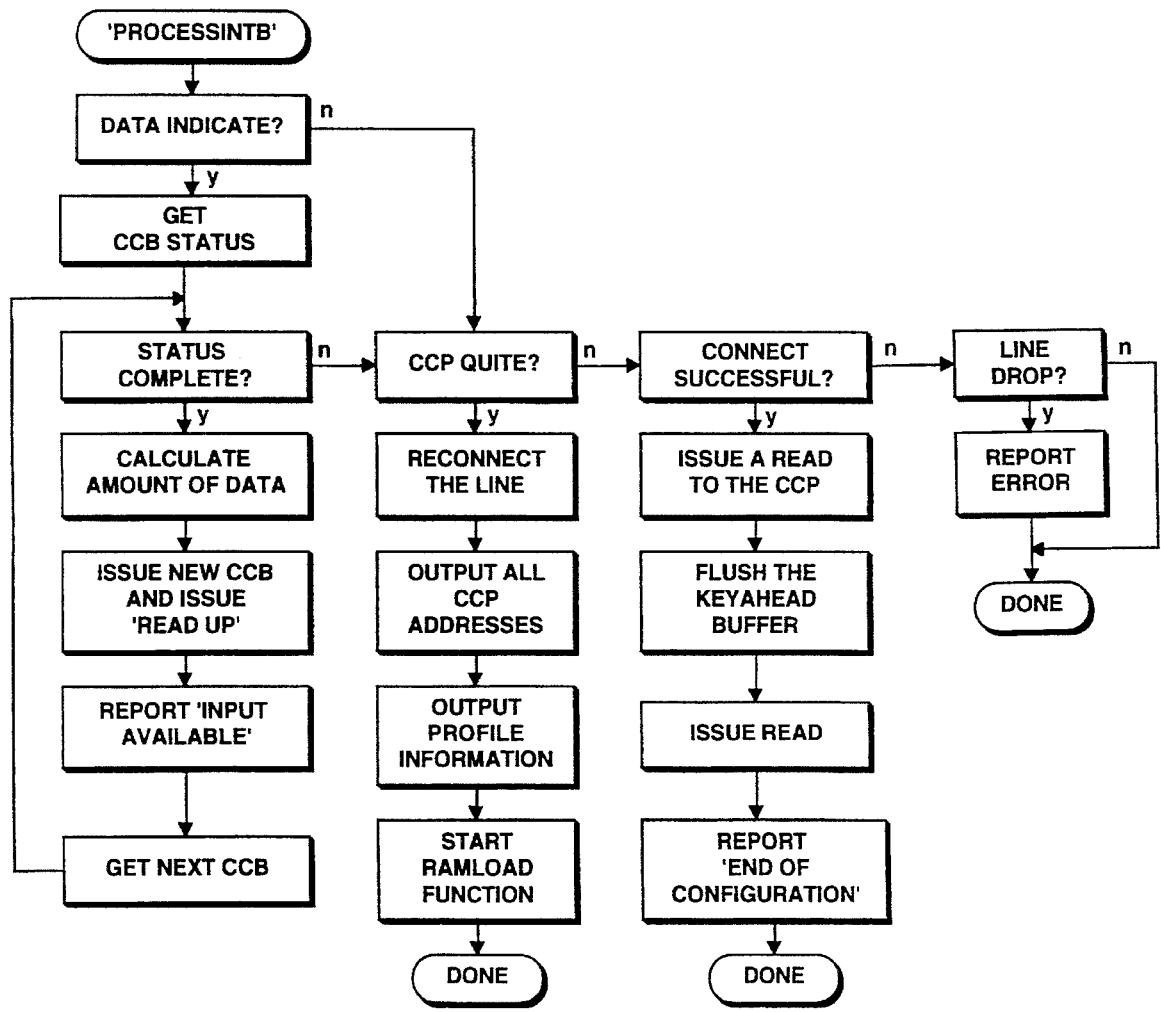

FIGS. 3i and 3j illustrate these operations as carried out by the MLX interrupt handler routines. For example, FIG. 3i shows the sequence wherein the handler fetches the line structure information for the interrupt using the channel number information provided by the interrupt dispatcher. The handler reads the interrupt B status information which is another LCT in the controller. The handler determines the reason for the interrupt and reads another LCT INTDB (INTBX) extension to find out if there is a further interrupt. If there is an interrupt, then the handler calls the process interrupt B routine process_intb() of FIG. 3j.

The interrupt routine using the information contained in the MLX Line specific data structure of block 206 handles the processing of the receipt of signals indicating-the occurrence of the following conditions: a CDB complete, a CCP quiet, a connection successful, connection unsuccessful and a line drop. This MLX physical driver module routine calls a TTY driver physical driver interrupt routine ihvspintr() to complete these asynchronously occurring conditions. Then control is returned back to the TTY driver module 202.

In the present case, as shown in FIG. 3j, the receipt of an interrupt indicating that the CCP is in a quiet state, results in reconnecting the line by sending an LCT20, outputting all CCP addresses, profile information etc. and starting the RAM load function. At this time, the profile information is written into the MLX controller RAM, a byte at a time. In response to the reconnect, the MLX controller sends back another interrupt for indicating whether the connect was successful. As shown in FIG. 3j, if the connect was successful, the interrupt handler issues a read to CCP indicating that it is ready to receive data. This is followed by flushing the keyboard buffer and a read.

As shown in FIG. 3f, the MLX driver processes I/O requests (read and write byte transfers) from the XCP application until the terminal is closed. In so doing, the MLX driver module operates in the "raw mode" wherein every character that comes in during a read operation is passed onto the user without any processing. Each character results in an interrupt being received by the common MLX interrupt dispatcher which in turn is passed onto the MLX interrupt handler.

Eventually, the user will disconnect (i.e., issue a close command) and this will result in switching from the MLX low level driver back to the CIM low level driver. At this time, the TTY driver will send a message back to the HVS TTY server which will issue an NTD IORB to reconnect the line back to the HVS operating system after the disconnect.

Figure 3K:
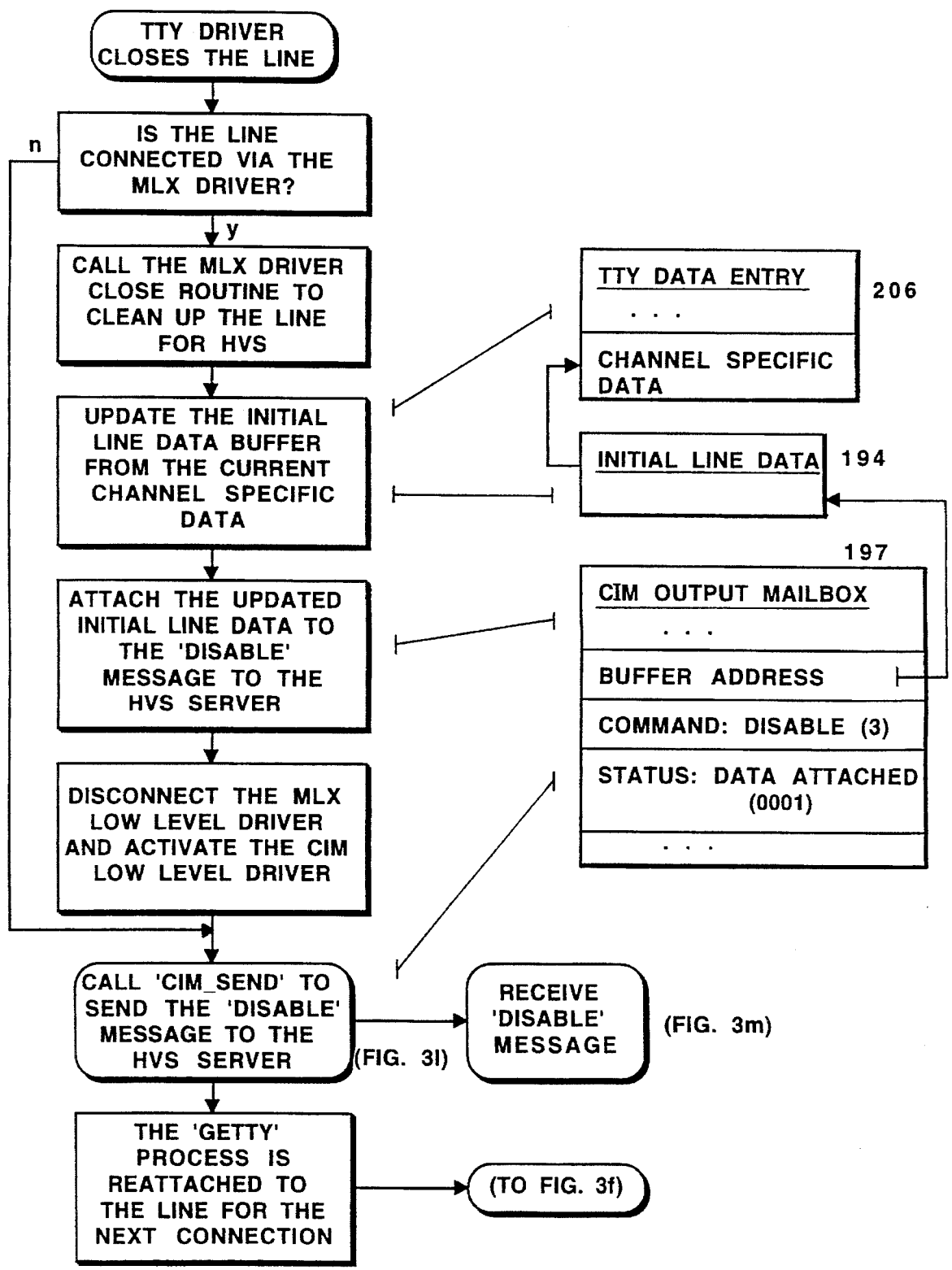

FIG. 3k shows the operations performed by the TTY driver module 202 in response to the close command. Upon determining that the close relates to the MLX driver module, the TTY driver close routine calls the MLX driver module close routine to clean up the line for the HVS operating system. The data structures are cleaned up and original levels for the interrupt A and B and the HVS cpu number are restored to the MLX controller. The routine sets the line state to "closing" and requests the transmit CCP to abort all reads. Next the TTY driver updates the initial line data from the current channel/line specific data contained in the table structure 206. This is done to reflect any changes to the line characteristics made by the user during the session (e.g. change in baud rate). This is followed by attaching the initial line data information to a CIM disable message which is loaded into a CIM output mailbox.

Figure 31:
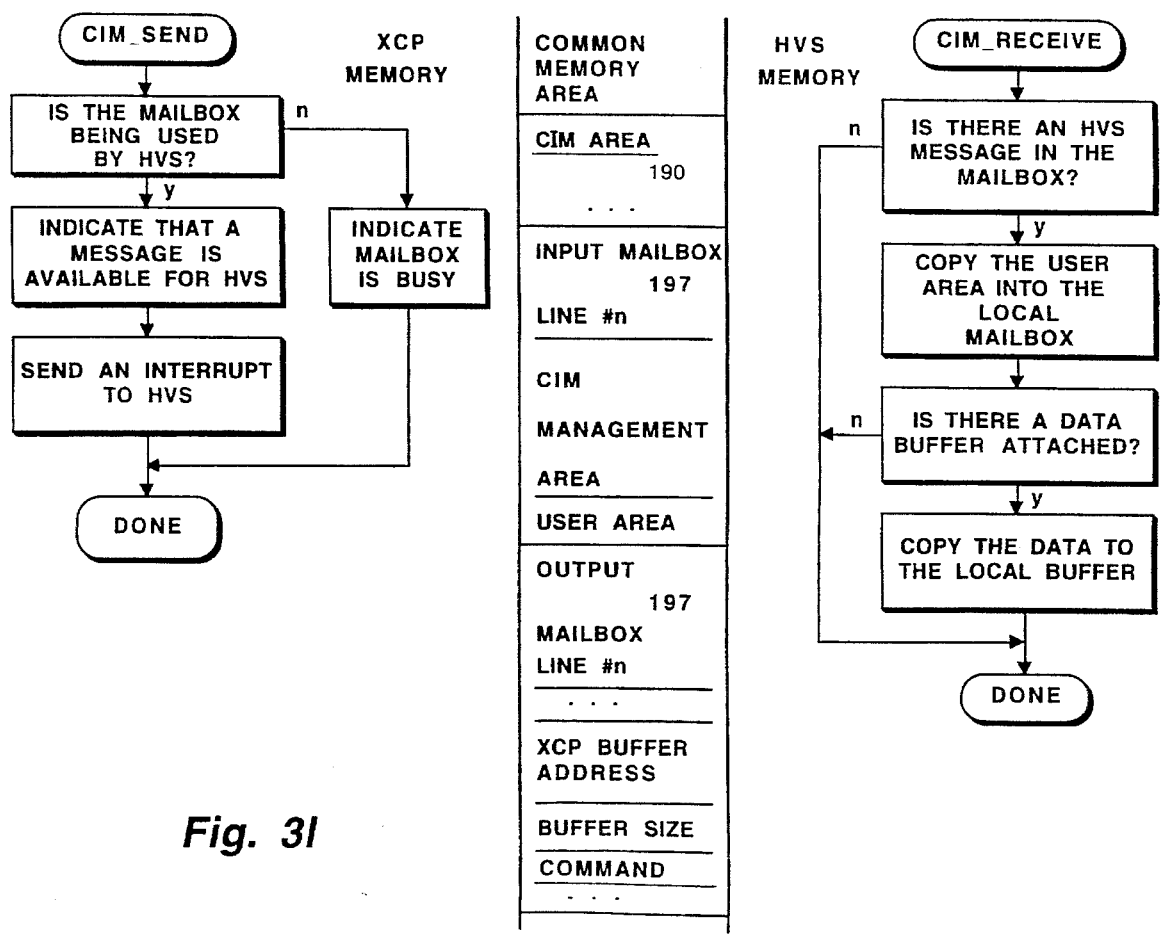

The TTY driver close routine restores the low level CIM driver by resetting the low level I/O connection type field of block 206. It then calls the CIM_send routine of FIG. 31 to send the DISABL CIM message to the HVS TTY server. This transfer operation is similar to the operation of FIG. 3e. The result is that the HVS TTY server is caused to wake up and start executing operations for dismantling the PTERM connection.

Figure 3M:
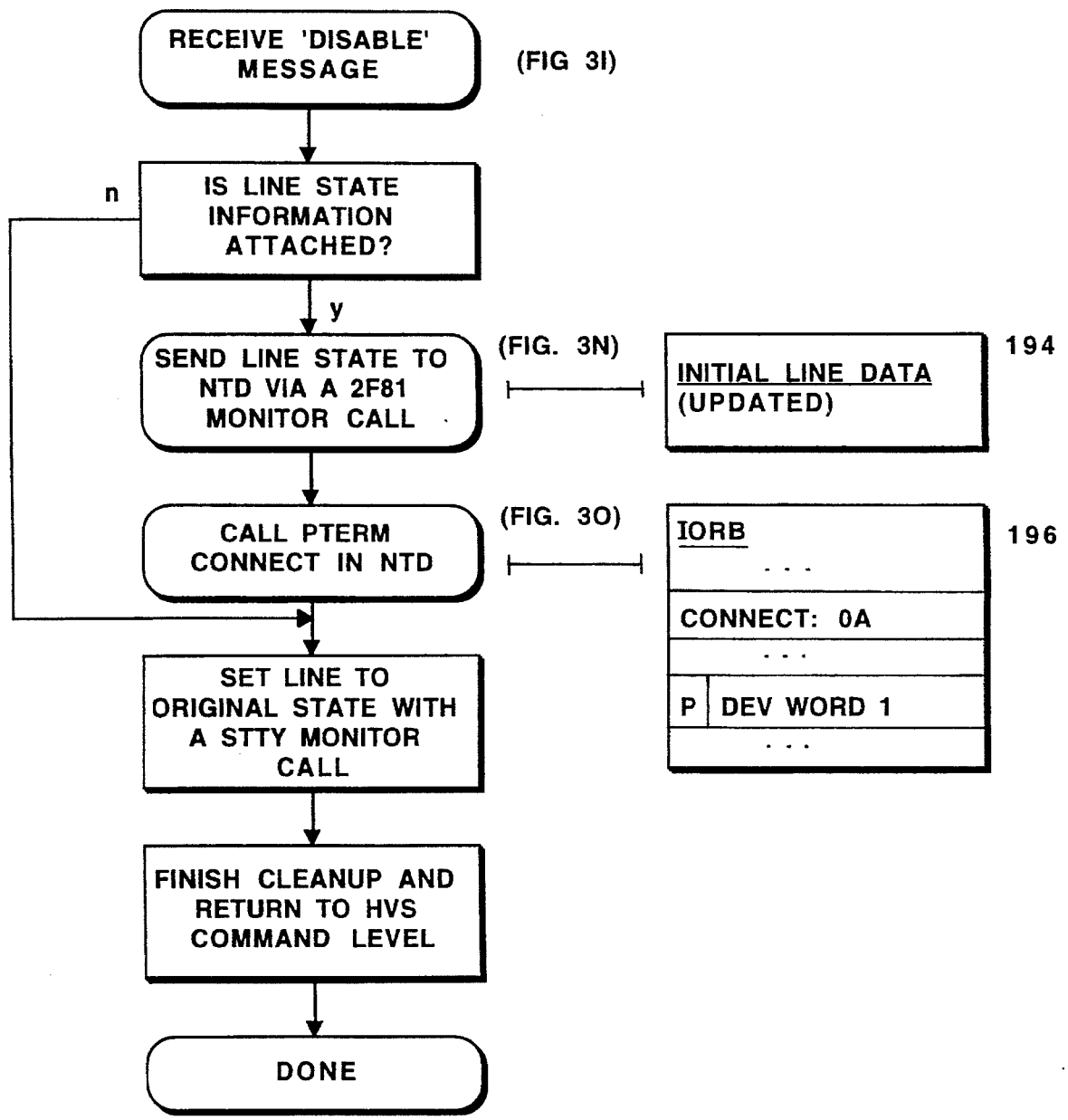
Figure 3N:
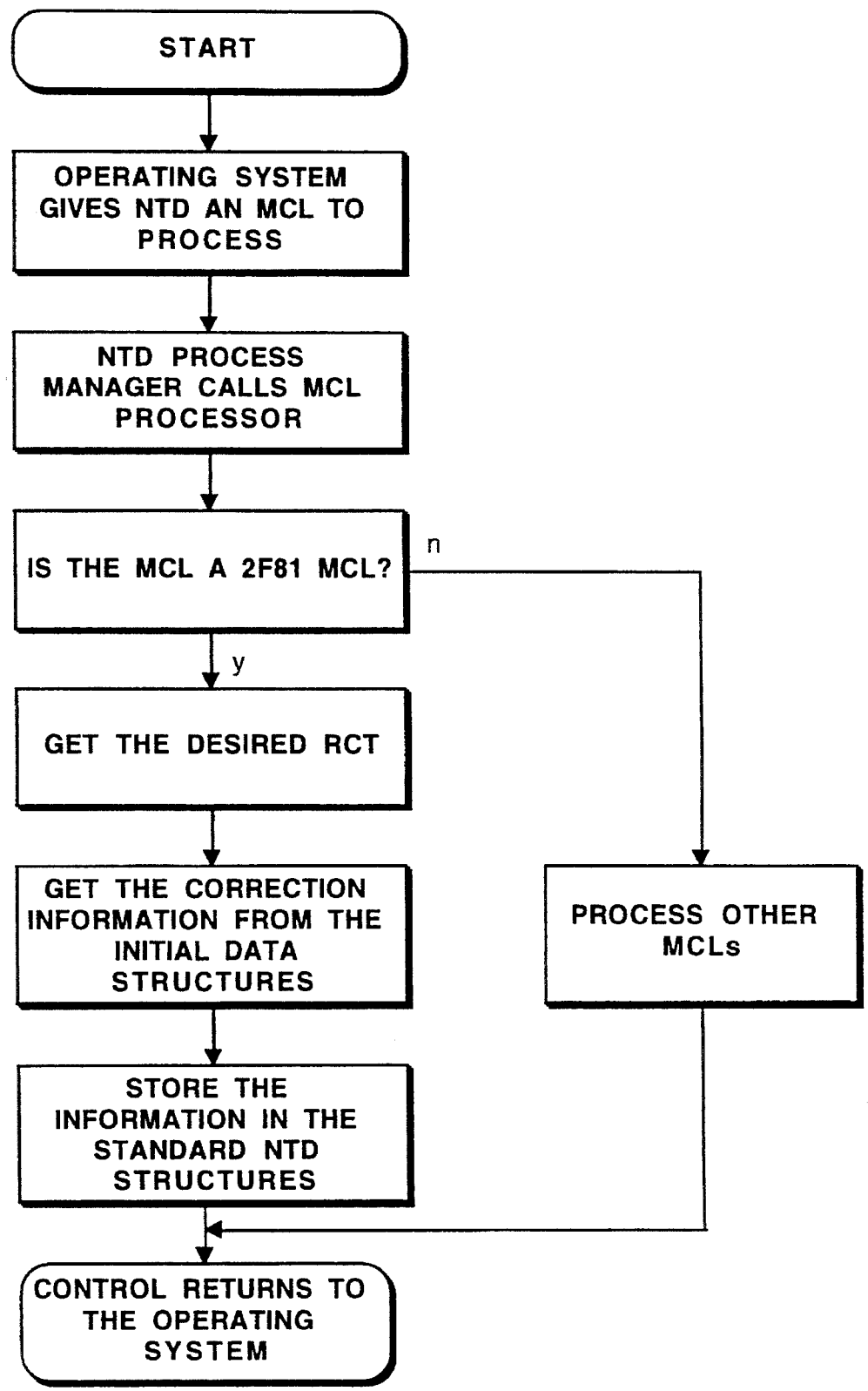
Figure 3O:
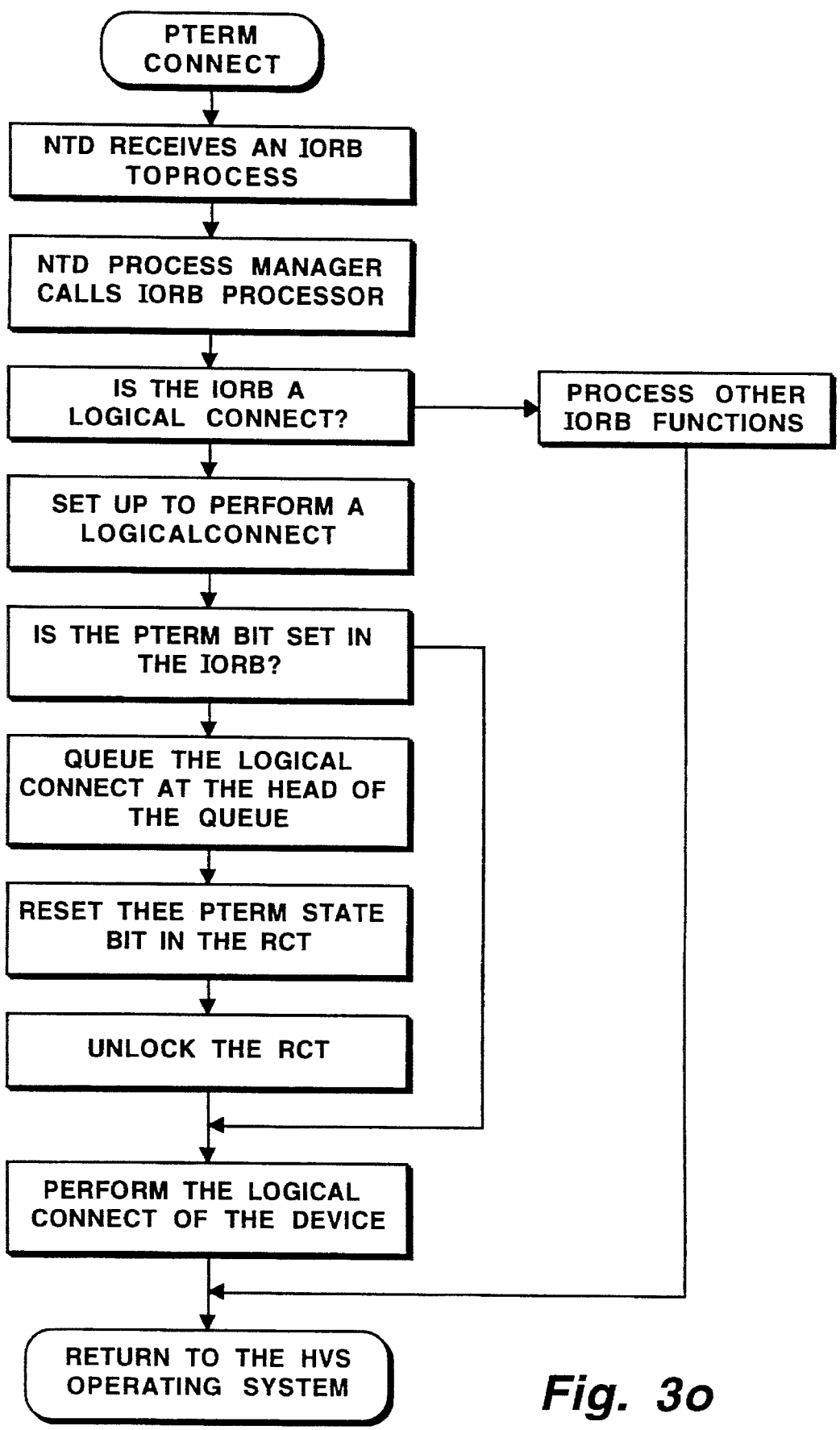

FIG. 3m illustrates the operations performed by the TTY server in dismantling the PTERM connection. As shown, the TTY server upon receipt of the CIM disable message checks if there is the current line state attached. If it is, first, the TTY server executes a store monitor call (2F81) for providing the updated information to the NTD driver module 194. This results in the NTD driver module performing the operations of FIG. 3c which stores the connection information and updates the NTD structures from the initial line data. The NTD driver module returns control back to the HVS operating system. Next, the TTY server issues system monitor call 0200 to the HVS system for providing a logical connect IORB with the PTERM bit set in the I_DVS field. More specifically, the NTD driver module then performs the operations of FIG. 3n. These operations are similar to those of FIG. 3c. As shown, the NTD driver module upon determining that the PTERM bit is set in the IORB, queues the logical connect at the head of the queue and resets the PTERM state bit in the RCT. This is followed by calling the function ZQNKQZ to unlock the RCT followed by the logical connect of the device. Control is thereafter returned to the HVS operating system. The TTY server then sets the line to the pre-xcp state, performs clean-up operations and exits to the HVS command level.

During the period of time that the terminal was being driven by the MLX driver under the control of the XCP operating system, any messages received by the NTD driver module directed to the terminal are automatically queued. When the terminal is switched back to the HVS operating system, the messages are displayed to the user by the NTD driver module.

From the above, it is seen how the present invention provides for the automatic switching of driver modules when a user originally logs onto a first operating system and then switches to a second operating system. When such switching occurs, a server module included in the first operating system determines if certain preestablished criteria is met for enabling the application to be driven directly by a physical driver module included within the second operating system which directly connects to the communications line through the facilities of the second operating system. If it does, the server module obtains and transfers the necessary line information for enabling such physical driver module to manage line communications. It also logically disconnects the driver module of the first operating system which managed the communications path when the user was using the first operating system. This improves system efficiency and terminal connectivity.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A terminal driver switching mechanism for enhancing the connectivity of a number of terminals in a data processing system comprising a first central processing unit (CPU) operating under the control of a first operating system, a second central processing unit operating under the control of a second operating system incompatible to said first operating system, a main memory and a plurality of controllers, said plurality of controllers including a number of multiline controllers connected to said number of terminals through a corresponding number of lines, said main memory, said plurality of controllers being tightly coupled to said first and second central processing units, said main memory including a communications area for establishing communications between said first and second operating systems; a first memory area for storing system and application components including a terminal driver (TTY) module including a low level driver for performing input/output operations for said applications running under said first operating system and a second memory area for storing system and application components of said second operating system including a server module and a network terminal driver (NTD) module used for performing input/output operations for user applications running under the control of said second operating system and for applications running under said first operating system in a virtual mode of operation for terminals connected to said lines of said controllers through said communications area, said TTY, server and NTD modules, said terminal driver switching mechanism comprising:

said TTY module further including an interface and driver selection means coupled to said low level driver and to said interface;

a multiplexer driver module included in said first operating system, said driver module being operatively coupled to said interface of said TTY module; and, said server module including means coupled to said NTD module, said server means in response to a switching of any one of said terminals from said second operating system to said first operating system to operate in said virtual mode, causing said NTD module to obtain connection information for transfer to said TTY module, said connection information enabling said driver selection means to establish connection of said one of said terminals to said multiplexer driver module in lieu of connection to said low level driver for transparently handling user application input/output operations previously required to be handled by said second operating system thereby improving overall system performance.

2. The system of claim of claim 1 wherein said first operating system is a UNIX based operating system and said second operating system is a proprietary based operating system.

3. The system of claim 1 wherein said server means in response to said operating system being switched causes said NTD module to be logically disconnected from said line.

4. The system of claim 1 wherein switching from said virtual mode to said multiplexer driver module occurs automatically in a manner which is seamless to a user.

5. The system of claim 4 wherein said second operating system includes means for issuing a switch command to said second operating system from any one of said number of terminals for switching to said first operating system and first processing unit, said server means when invoked by said switch command which includes a predetermined argument overriding initiation of operations related to switching from said virtual mode to said multiplexer module.

6. The system of claim 1 wherein said number of said controllers each operate under firmware control and said server means includes means for obtaining information from said second operating system stored in said second area of memory specifying physical driver and controller line characteristics, said server means using said information for determining whether said terminal being switched can be physically driven by said multiplexer module.

7. The system of claim 6 wherein said information includes driver type, controller type and firmware release number, said server means upon determining that said driver type corresponds to said NTD module, said controller type corresponds to said one of said number of multiline controllers and said firmware release number has a value greater than a predetermined value causing initiation of said switching to said multiplexer driver module.

8. The system of claim 7 wherein said server means initiates said switching by generating a predetermined monitor call to said second operating system for having said NTD module return said connection information stored in said second memory area to said server means for transfer to said TTY module through said communications area.

9. The system of claim 8 wherein said connection information stored in said second memory area is attached to a server ready message generated by said server means and transferred to said TTY module through said communications area.

10. The system of claim 8 wherein said TTY module switching means includes a table area having a plurality of locations for storing a plurality of TTY data array entries, each entry including a connection type field, said switching means in response to said connection information switching said connection type field to a predetermined state specifying establishment of a connection to said multiplexer module.

11. The system of claim 2 wherein said second area of memory further includes a number of input output request block (IORB) structures generated by said second operating system in response to applications running under said second operating system, each IORB containing an indicator field which when set to a predetermined state designates that there is a connection to said multiplexer module and wherein said NTD module includes processing means for processing IORBs transferred to said NTD module for processing, said server means generating a predetermined monitor call to said second operating system, said second operating system generating a disconnect command to said NTD module which includes one of said IORBs corresponding to said switched application, said processing means in response to said disconnect command when said indicator field is set to said predetermined state, placing said line in a special logical disconnect state which prevents said line from being connected to another driver.

12. The system of claim 11 wherein each of said IORBs has an associated resource control table containing an indicator field whose state designated when said line is connected to be driven by said multiplexer module, said NTD module processing means switching said indicator field to said predetermined state for placing said line in said special logical disconnect state.

13. The system of claim 9 wherein said second memory area further includes a table having a plurality of locations for storing a number of initial line state data entries, said table being accessible by said server and NTD module, said NTD module further including a number of structures containing connection information pertaining to each of the lines being driven by said NTD module, said NTD module in response to said predetermined monitor call obtaining said connection information from certain ones of said number of structures and storing said connection information in one of said initial line state data entries for attachment by said server means to said server ready message for receipt by said TTY module.

14. The system of claim 13 wherein said TTY module further includes a table area having a plurality of locations for storing a plurality of TTY data array entries, each entry including a connection type field, said TTY module in response to a close command from one of said applications running under said first operating system opened to establish communications with said one of said terminals, referencing one of said TTY data entries corresponding to said terminal for determining whether said connection type field specifies said multiplexer module, said TTY module including means for generating a call to said multiplexer module through said interface for cleaning up said line for use by said second operating system when said connection type field specifies connection to said multiplexer module and said TTY module updating said one of said initial line data entries to reflect any changes made in line characteristics for transfer to said server means through said communications area.

15. The system of claim 14 wherein said TTY module switches said connection type field from said predetermined state to another state specifying establishment of reconnection to said low level driver.

16. The system of claim 14 wherein said one of said initial line data entries is attached to a disable message for transfer to said server means through said communications area.

17. The system of claim 16 wherein said server means in response to said disable message generates a predetermined call to said second operating system requiring said NTD module to restore a line to an original connection state, said NTD module in response to said predetermined call obtaining said connection information from said one of said initial line data entries and storing said connection information in said certain ones of said number of NTD structures.

18. The system of claim 11 wherein said server means in response to a disable message from said TTY driver generates a predetermined call to said second operating system, said second operating system generating a connect command to said NTD module which includes said one of said IORBs, said processing means in response to said connect command when said indicator field is set to said predetermined state, switching said line from said special logical disconnect state to a connect state.

19. The system of claim 18 wherein each of said IORBs has an associated resource control table containing an indicator field whose state designated when said line is connected to be driven by said multiplexer module, said NTD module processing means in response to said connect command switching said indicator field from said predetermined state to another state for placing said line in its previous state prior to connection to said multiplexer module.

20. A method for enhancing the connectivity of a number of terminals in a data processing system comprising a first central processing unit (CPU) operating under the control of a first operating system, a second central processing unit operating under the control of a second operating system incompatible to said first operating system, a main memory and a plurality of controllers, said plurality of controllers including a number of multiline controllers connected to said number of terminals through a corresponding number of lines, said main memory, said plurality of controllers being tightly coupled to said first and second central processing units, said main memory including a communications area for establishing communications between said first and second operating systems; a first memory area for storing system and application components including a terminal driver (TTY) module including a low level driver for performing input/output operations for said applications running under said first operating system and a second memory area for storing system and application components of said second operating system including a server module and a network terminal driver (NTD) module used for performing input/output operations for user applications running under the control of said second operating system and for applications running under said first operating system in a virtual mode of operation for terminals connected to said lines of said controllers through said communications area, said TTY, server and NTD modules, said method comprising the steps of:

(a) including in said TTY module, an interface and driver selection means which couples to said low level driver and to said interface;

(b) including in said first operating system, a multiplexer driver module which operatively couples to said interface;

(c) invoking said server module in response to each switch command issued to said second operating system from any one of said terminals for switching an application to said first operating system;

(d) said server module determining according to preestablished criteria whether said application being switched can be driven physically by said multiplexer module;

(e) when said application is determined in step (d) as capable of being driven by said multiplexer module, said server module initiating a physical connection between said multiplexer driver module and said application by passing connection information to said TTY driver;

(f) said server module logically disconnecting said NTD driver from said application; and, (g) said TTY driver module using said connection information to establish a connection between said application and said multiplexer module so that all input/output operations initiated by said application pass through said multiplexer module instead of said NTD driver of said second operating system thereby improving terminal connectivity.

21. The method of claim 20 wherein said each of said multiline controllers operate under firmware control and wherein step (d) of said method further includes the steps of:

(h) determining that the type of driver driving said application terminal line corresponds to said NTD module;

(i) determining that the type of controller connected to said application terminal line is a multiline controller; and, (j) determining that the firmware controlling said multiline controller has a release designation greater than a predetermined value, said predetermined criteria being met by satisfying all of the conditions specified in steps (h) through (j).

22. The method of claim 21 wherein step (c) further includes the step of including a predetermined argument in said switch command for overriding server initiation of an automatic connection of said application terminal line to said multiplexer driver module.

23. The method of claim 20 wherein said TTY driver module further includes a table area having a plurality of locations for storing a plurality of TTY data array entries, each entry including a connection type field, said method further including the steps of:

(k) said TTY driver module in response to a close command from said application, referencing one of said TTY data entries corresponding to said terminal line for determining whether said line is being driven by said multiplexer driver module;

(l) said TTY driver module generating a call to said multiplexer driver module to clean up said terminal line for use by said second operating system when driven by said multiplexer driver module;

(m) said TTY driver module updating one of said initial line data entries to reflect any changes made in line characteristics; and, (n) said TTY driver module transferring an updated version of said one of said initial line data entries to said server module through said communications area for use in establishing connection of said terminal line to said NTD driver of said second operating system.

* * * * *